(12) United States Patent
Bharadwaj et al.

(10) Patent No.: US 9,059,819 B2
(45) Date of Patent: Jun. 16, 2015

(54) FLEXIBLE UPLINK CONTROL CHANNEL CONFIGURATION

(75) Inventors: Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 12/966,934

(22) Filed: Dec. 13, 2010

(65) Prior Publication Data

US 2011/0200015 A1    Aug. 18, 2011

Related U.S. Application Data

(60) Provisional application No. 61/321,858, filed on Apr. 7, 2010, provisional application No. 61/304,315, filed on Feb. 12, 2010.

(51) Int. Cl.
*H04L 1/00* (2006.01)
*H04L 1/18* (2006.01)
*H04L 1/16* (2006.01)
*H04L 5/00* (2006.01)

(52) U.S. Cl.
CPC .............. *H04L 1/0026* (2013.01); *H04L 1/0027* (2013.01); *H04L 1/0028* (2013.01); *H04L 1/1671* (2013.01); *H04L 1/1861* (2013.01); *H04L 5/0007* (2013.01); *H04L 5/001* (2013.01); *H04L 5/0048* (2013.01); *H04L 5/0053* (2013.01)

(58) Field of Classification Search
CPC ........................... H04L 1/0026; H04B 7/0632
USPC .......................................................... 370/335
See application file for complete search history.

(56) References Cited

U.S. PATENT DOCUMENTS

| | | | |
|---|---|---|---|
| 7,961,700 | B2 | 6/2011 | Malladi et al. |
| 2006/0023745 | A1 | 2/2006 | Koo |
| 2006/0109923 | A1 | 5/2006 | Cai |
| 2007/0091817 | A1 | 4/2007 | Yoon et al. |
| 2008/0043867 | A1 | 2/2008 | Blanz |
| 2008/0080641 | A1* | 4/2008 | Kim .............................. 375/299 |

(Continued)

FOREIGN PATENT DOCUMENTS

| | | |
|---|---|---|
| CN | 101223752 A | 7/2008 |
| CN | 101536362 A | 9/2009 |

(Continued)

OTHER PUBLICATIONS

International Search Report and Written Opinion—PCT/US2011/024643—ISA/EPO—Jun. 1, 2011.

(Continued)

*Primary Examiner* — Anh-Vu Ly
*Assistant Examiner* — Abdullahi Ahmed
(74) *Attorney, Agent, or Firm* — Darren M. Simon

(57) ABSTRACT

Systems, methods, devices, and computer program products are described for transmission of downlink channel quality information and acknowledgment information in a multi-carrier wireless communication system. Channel quality information may be estimated for a number of downlink carriers. An uplink control channel may be configured in a flexible manner based on the number of activated carriers and whether those carriers are configured with MIMO. The feedback cycle for the channel quality information may remain constant.

41 Claims, 15 Drawing Sheets

(56) References Cited

U.S. PATENT DOCUMENTS

| | | |
|---|---|---|
| 2008/0253336 A1 | 10/2008 | Parkvall et al. |
| 2009/0046805 A1 | 2/2009 | Kim |
| 2009/0180561 A1* | 7/2009 | Kim et al. ............ 375/260 |
| 2009/0257383 A1* | 10/2009 | Lee et al. ............ 370/329 |
| 2009/0262695 A1* | 10/2009 | Chen et al. ............ 370/329 |
| 2010/0172428 A1* | 7/2010 | Pani et al. ............ 375/262 |
| 2010/0208680 A1* | 8/2010 | Nam et al. ............ 370/329 |
| 2011/0026420 A1* | 2/2011 | Zhang et al. ............ 370/252 |
| 2011/0249656 A1 | 10/2011 | Cai et al. |

FOREIGN PATENT DOCUMENTS

| | | |
|---|---|---|
| JP | 2009509393 A | 3/2009 |
| JP | 2011065440 A1 | 11/2009 |
| JP | 2011529664 A | 12/2011 |
| RU | 2163056 C2 | 2/2001 |
| RU | 2008106235 A | 8/2009 |
| WO | 2006116102 A2 | 11/2006 |
| WO | 2007020994 A1 | 2/2007 |
| WO | 2007035047 A2 | 3/2007 |
| WO | WO2009023730 | 2/2009 |
| WO | 2010013963 A2 | 2/2010 |
| WO | 2011065440 A1 | 6/2011 |

OTHER PUBLICATIONS

Qualcomm Incorporated: "HS-DPCCH Design for 4C-HSDPA: Open Issues" 3GPP TSG RAN WG1 Meeting #60, R1-101328, San Francisco, USA, Feb. 22-26, 2010, pp. 1-9.
Taiwan Search Report—TW100104815—TIPO—Oct. 1, 2014.

* cited by examiner

FLEXIBLE UPLINK CONTROL CHANNEL CONFIGURATION

CROSS-REFERENCES TO RELATED APPLICATIONS

This application claims priority from co-pending U.S. Provisional Patent Application No. 61/321,858, filed Apr. 7, 2010, entitled "FLEXIBLE CHANNEL QUALITY INDICATOR CONFIGURATION" and from co-pending U.S. Provisional Patent Application No. 61/304,315, filed Feb. 12, 2010, entitled "FLEXIBLE HS-DPCCH MAPPING IN 4C-HSDPA," each of which is hereby incorporated by reference, as if set forth in full in this document, for all purposes.

BACKGROUND

The following relates generally to wireless communication, and more specifically to transmission of downlink channel quality information in multi-carrier wireless communication systems. Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system may include a number of base stations to simultaneously support communication for multiple mobile terminals. Each mobile terminal communicates with one or more base stations via transmissions on the forward and reverse links. A reference to a "downlink" refers to the communication link from the base stations to the terminals, and a reference to an "uplink" refers to the communication link from the terminals to the base stations. The system may support operation on multiple carriers. Each carrier may be associated with a particular center frequency and a particular bandwidth. Each carrier may carry pilot and overhead information to support operation on the carrier, and carry data for terminals operating on the carrier.

Downlink channel quality information may be measured by each mobile terminal. When multiple carriers are used on the downlink for transmission to a mobile terminal, the configuration of the transmission of this information on the uplink may present challenges in power conservation and mapping.

SUMMARY

The described features generally relate to the uplink transmission of downlink channel quality information measured at a mobile terminal. Further scope of the applicability of the inventive aspects will become apparent from the following detailed description, claims, and drawings. The detailed description and specific examples are given by way of illustration only, since various changes and modifications within the spirit and scope of the description will become apparent to those skilled in the art.

Systems, methods, devices, and computer program products are described for transmission of downlink channel quality information in a multi-carrier wireless communication system. Channel quality information may be estimated for a number of downlink carriers. An uplink control channel may be configured based on the number of activated carriers, and whether those carriers are configured with MIMO. Thus, the frame structure, coding, and mapping for the uplink control channel may be flexible based on the number of activated carriers. The feedback cycle for the channel quality information may remain constant. In one example, channel quality information is grouped for one or more carriers in a single codeword. The codeword may be repeated. In some examples, a codeword is repeated and power consumption in a transmitting device is reduced.

In one set of examples, a method for wireless communications includes estimating channel quality information for a plurality of downlink carriers, and configuring an uplink control channel based at least in part on a number of activated carriers in the plurality. The configuration of the uplink control channel may include repeating a codeword within a portion of a transmit timing interval when there is a first number of activated carriers in the plurality, and reducing power in a mobile device transmitting the uplink control channel responsive to the repeating. The uplink control channel may be configured to maintain a constant feedback cycle for different numbers of activated carriers.

Configuring the uplink control channel may include encoding, when there is a first number of activated carriers in the plurality, channel quality information for a first carrier in a first codeword and channel quality information for a second carrier in a second codeword; and grouping the first codeword and the second codeword for transmission within a transmit timing interval. Configuring the uplink control channel may further include grouping, when a second number of the plurality of downlink carriers are activated, channel quality information for a first carrier in a third codeword; and repeating the codeword in the transmit timing interval.

Configuring the uplink control channel may include encoding, when there is a first number of activated carriers in the plurality, acknowledgement information for a first carrier and a second carrier using a first codeword and acknowledgement information for a third carrier and a fourth carrier using a second codeword; and grouping the first codeword and the second codeword for transmission within a slot of a transmit timing interval. Configuring the uplink control channel may further include encoding, when there is a second number of activated carriers in the plurality, acknowledgement information for one or more carriers using a third codeword; and repeating the third codeword within the slot of the transmit timing interval.

Configuring the uplink control channel may include encoding, when there are three activated carriers in the plurality, acknowledgement information for a first carrier and a second carrier using a first codeword and acknowledgement information for a third carrier using a second codeword; and grouping the first codeword and the second codeword for transmission within a slot of a transmit timing interval. Configuring the uplink control channel may include encoding acknowledgement information for one or more carriers using a first codeword for transmission within a half-slot of a transmit timing interval. Configuring the uplink control channel may include configuring an uplink control channel based at least in part on whether one or more of the plurality of downlink carriers are configured with MIMO. Configuring the uplink control channel may include using a first spreading factor for a portion of transmit timing interval when there is a first number of activated carriers in the plurality; and using a second spreading factor for the portion of transmit timing interval when there is a second number of activated carriers in the plurality, the second number different from the first number. Configuring the uplink control channel may include encoding, when there is a discontinuous transmission for one or more activated carriers in the plurality, acknowledgement information for the one or more carriers using a codeword signifying a discontinuous transmission. Configuring the uplink control channel may include mapping a first carrier to a first portion of a transmit timing interval when there is a first number of activated carriers in the plurality; and mapping the first carrier to a second portion of a transmit timing interval when there is a second number of activated carriers in the plurality, the second number different from the first number.

Configuring the uplink control channel may include identifying at least four carriers, the four carriers associated with a logical sequential order; identifying deactivation of one of the at least four carriers; and preserving a logical sequential order of remaining active carriers on the uplink control channel. Configuring the uplink control channel may include identifying activation of a first number of carriers; identifying activation of an additional carrier; and changing configuration of the uplink control channel responsive to the activation of the additional carrier.

In another set of examples, a mobile terminal for wireless communications may include a channel quality information measurement module configured to estimate channel quality information for a plurality of downlink carriers; and a feedback encoder module, communicatively coupled with the channel quality information measurement module, and configured to modify an uplink control channel based at least in part on a number of activated carriers in the plurality.

The feedback encoder module may modify the uplink control channel by repeating a codeword for a portion of a transmit timing interval when there is a first number of activated carriers in the plurality; and using varied codewords for the portion of the transmit timing interval when there is a second number of activated carriers in the plurality, the second number different from the first number. The feedback encoder module may modify the uplink control channel by repeating a codeword in a transmit timing interval; and reducing transmission power in the mobile terminal responsive to the repetition. The feedback encoder module may maintain a constant feedback cycle for different numbers of activated carriers.

The feedback encoder module may modify the uplink control channel by grouping, when a first number of the plurality of downlink carriers are activated, channel quality information for a first carrier in a first codeword; and repeating the codeword in a portion of a transmit timing interval. The feedback encoder module may modify the uplink control channel by encoding, when there is a second number of activated carriers in the plurality, channel quality information for a first carrier in a second codeword and channel quality information for a second carrier in a third codeword; and grouping the second codeword and the third codeword for transmission within the portion of the transmit timing interval.

The feedback encoder module may modify the uplink control channel by encoding, when there is a first number of activated carriers in the plurality, acknowledgement information for a first carrier and a second carrier using a first codeword and acknowledgement information for a third carrier and a fourth carrier using a second codeword; and grouping the first codeword and the second codeword for transmission within a slot of a transmit timing interval. The feedback encoder module may modify the uplink control channel by encoding, when there is a second number of activated carriers in the plurality, acknowledgement information for two carriers using a third codeword; and repeating the third codeword within the slot of the transmit timing interval. The feedback encoder module may modify the uplink control channel by encoding, when there are three activated carriers in the plurality, acknowledgement information for a first carrier and a second carrier using a first codeword and acknowledgement information for a third carrier using a second codeword; and grouping the first codeword and the second codeword for transmission within a slot of a transmit timing interval.

The feedback encoder module may modify the uplink control channel by encoding acknowledgement information for one or more carriers using a first codeword for transmission within a half-slot of a transmit timing interval. The feedback encoder module may modify the uplink control channel by encoding, when there is a first number of activated carriers in the plurality, acknowledgement information for the one or more of the activated carriers using a codeword signifying a discontinuous transmission. The feedback encoder module may modify an uplink control channel based at least in part on whether one or more of the plurality of downlink carriers are configured with MIMO. The feedback encoder module may modify the uplink control channel by using a first spreading factor for a portion of a transmit timing interval when there is a first number of activated carriers in the plurality; and using a second spreading factor for the portion of the transmit timing interval when there is a second number of activated carriers in the plurality, the second number different from the first number. The feedback encoder module may modify the uplink control channel by mapping a first carrier to a first portion of a transmit timing interval when there is a first number of activated carriers in the plurality; and mapping the first carrier to a second portion of a transmit timing interval when there is a second number of activated carriers in the plurality, the second portion different from the first portion. In one example, at least four carriers are activated, the four carriers associated with a logical sequential order; and when one of the at least four carriers are de-activated, the logical sequential order of the remaining active carriers is preserved in the uplink control channel. In another example, the channel quality information measurement module is further configured to identify a first number of carriers; and identify activation of an additional carrier; and the feedback encoder module is further configured to modify configuration of the uplink control channel responsive to the activation of the additional carrier.

In another set of examples, a device for wireless communications includes means for estimating channel quality information for a plurality of downlink carriers; and means for configuring an uplink control channel based at least in part on a number of activated carriers in the plurality. The means for configuring the uplink control channel may include means for repeating a codeword within a portion of a transmit timing interval when there is a first number of activated carriers in the plurality. The means for configuring the uplink control channel may include means for reducing power in a mobile device transmitting the uplink control channel responsive to the repeating. The means for configuring the uplink control channel may maintain a constant feedback cycle for different numbers of activated carriers. The means for configuring the uplink control channel may include means to configure an uplink control channel based at least in part on whether one or more of the plurality of downlink carriers are configured with MIMO.

In another set of examples, a computer program product includes a computer-readable medium with code for causing a computer to estimate channel quality information for a plurality of downlink carriers; and code for causing a computer to configure an uplink control channel based at least in part on a number of activated carriers in the plurality. There may be code for causing a computer to repeat a codeword within a portion of a transmit timing interval when there is a first number of activated carriers in the plurality. There may be code for causing a computer to reduce power in a mobile device transmitting the uplink control channel responsive to the repeating. There may be code for causing a computer to configure an uplink control channel based at least in part on whether one or more of the plurality of downlink carriers are configured with MIMO.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
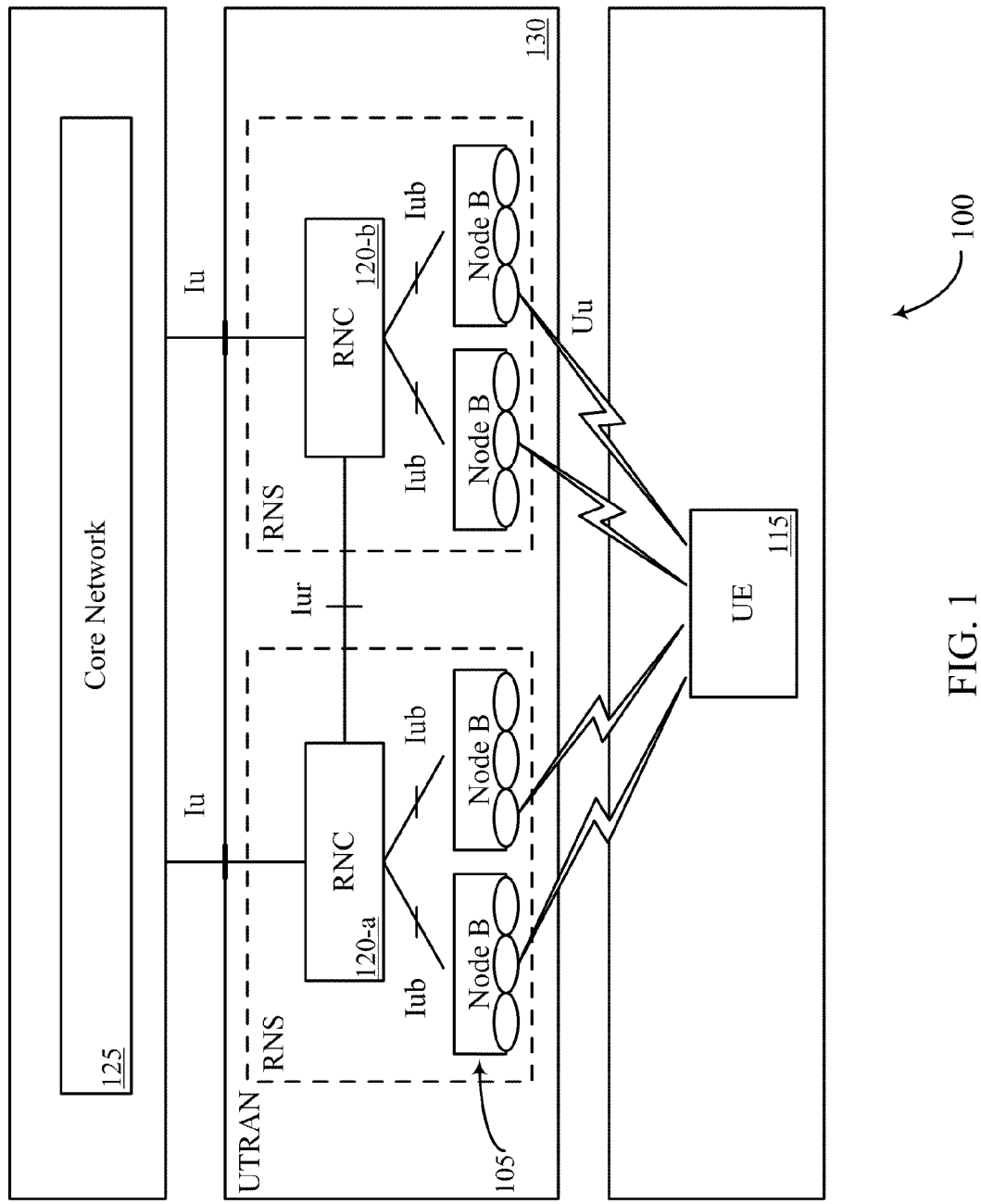
FIG. 1 is a block diagram of a radio access system having two radio network subsystems along with its interfaces to core and user equipment.

Systems, methods, devices, and computer program products are described for transmission of downlink channel quality information in a multi-carrier wireless communication system. Channel quality information (which may also be referred to herein as "CQI") may be estimated for a number of downlink carriers. An uplink control channel may be configured based on the number of activated carriers, and whether those carriers are configured with MIMO. Thus, the frame structure, encoding, and mapping for the uplink control channel may be flexible based on the number of activated carriers. The feedback cycle for the channel quality information may remain constant. In one example, channel quality information is grouped for one or more carriers in a single codeword, and the codeword may be repeated in certain instances. In some examples, a codeword is repeated and power consumption in a transmitting device is reduced.

This description provides examples, and is not intended to limit the scope, applicability, or configuration of the invention. Rather, the ensuing description will provide those skilled in the art with an enabling description for aspects of the invention. Various changes may be made in the function and arrangement of elements without departing from the spirit and scope of the invention.

Thus, various embodiments may omit, substitute, or add various procedures or components as appropriate. For instance, it should be appreciated that the methods may be performed in an order different from that described, and that various steps may be added, omitted, or combined. Also, features described with respect to certain examples may be combined in various other examples.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, methods, devices, and computer program products are described for transmission of downlink channel quality information in a multi-carrier wireless communication system. Channel quality information may be estimated for a number of downlink carriers. An uplink control channel may be configured based on the number of activated carriers. Techniques described herein may be used for various wireless communication systems such as CDMA, TDMA, FDMA, OFDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA.

UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a block diagram illustrates an example of a wireless communication system 100. Node Bs 105 and radio network controllers (RNCs) 120 are parts of the radio network 100. The radio network may be a UMTS Terrestrial Radio Access Network 130 (UTRAN). A UTRAN 130 is a collective term for the Node Bs 105 (or base stations) and the control equipment for the Node Bs 105 (or RNC 120) it contains which make up the UMTS radio access network. This is a 3 G communications network which can carry both real-time circuit switched and IP-based packet-switched traffic types. The UTRAN 130 provides an air interface access method for the user equipment (UE) 115. Connectivity is provided between the UE 115 and the core network 125 by the UTRAN 130. The radio network 100 may transport data packets to multiple UEs 115.

The UTRAN 130 is connected internally or externally to other functional entities by four interfaces: Iu, Uu, Iub and Iur. The UTRAN 130 is attached to a GSM core network 125 via an external interface called Iu. RNCs 120 support this interface. In addition, the RNCs 120 manage a set of base stations called Node Bs 105, through interfaces labeled Iub. The Iur interface connects the two RNCs 120-*a*, 120-*b* with each other. The UTRAN 130 is largely autonomous from the core network 125 since the RNCs 120 are interconnected by the Iur interface. FIG. 1 discloses a communication system which uses the RNC 120, the Node Bs 105 and the Iu and Uu interfaces. The Uu is also external and connects the Node Bs 105 with the UE 115, while the Iub is an internal interface connecting the RNCs 120 with the Node Bs 105.

The radio network 100 may be further connected to additional networks outside the radio network 100, such as a corporate intranet, the Internet, or a conventional public switched telephone network as stated above, and may transport data packets between each UE 115 and such outside networks. Each UE 115 may measure channel quality information for a number of downlink carriers. An uplink control channel may be configured by a UE 115 based on the number of activated carriers, and whether those carriers are configured with MIMO. Thus, a UE 115 may flexibly configure the frame structure, encoding, and mapping based on the number of activated carriers.

Figure 2:
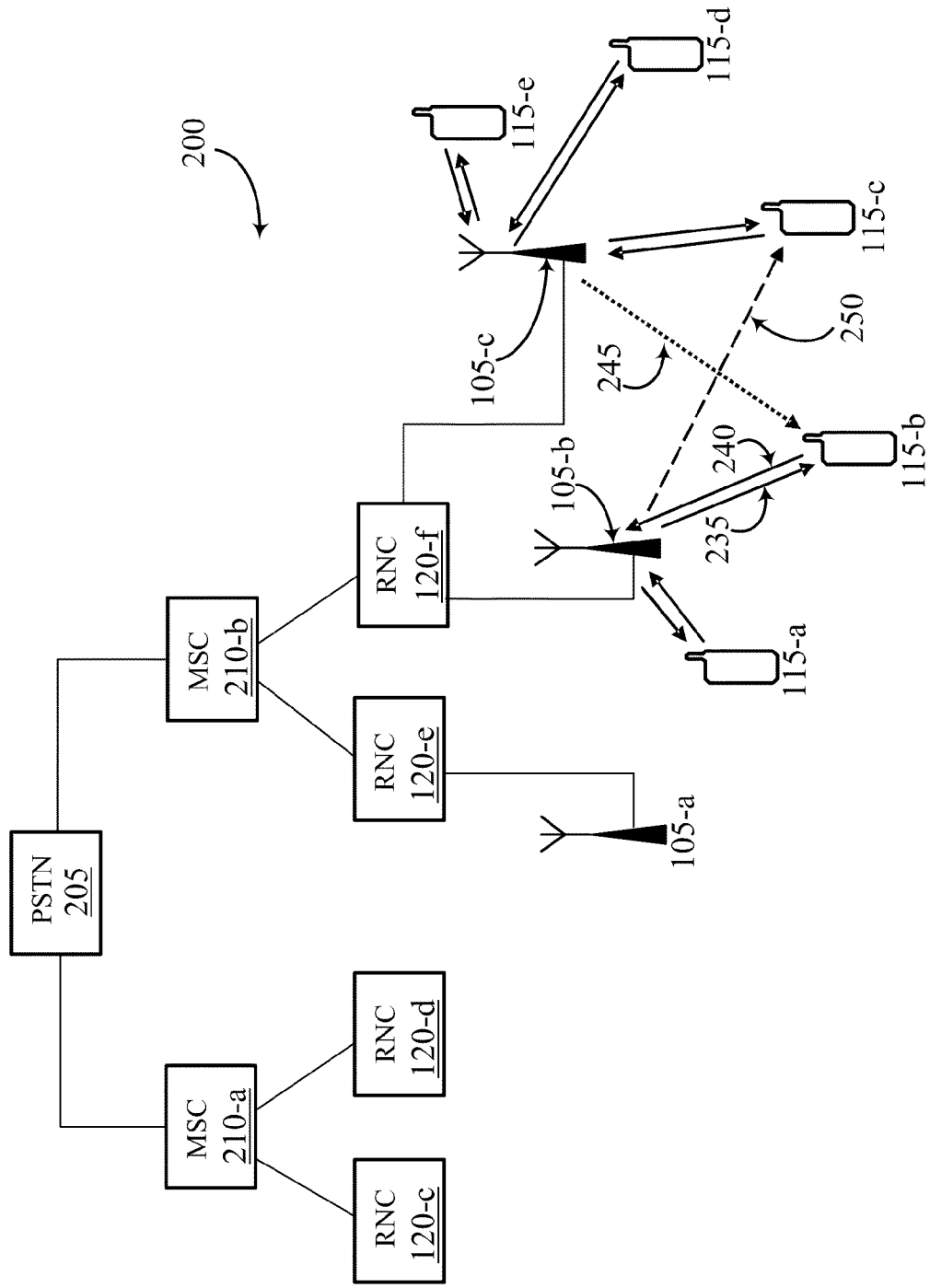
FIG. 2 is a simplified representation of a cellular communications system.

FIG. 2 illustrates examples of selected components of a communication network 200 within which aspects of the invention may be implemented. Communication network 200 includes RNCs 120 coupled to Node Bs 105. This communication network 200 may be an example of the wireless communication system 100 of FIG. 1. The Node Bs 105 communicate with UEs 115 through corresponding wireless connections 235, 240, 245, 250. As described above, a communications channel includes a forward link (also known as a downlink) 235 for transmissions from the Node Bs 105 to the UE 115, and a reverse link (also known as an uplink) 240 for transmissions from the UE 115 to the Node Bs 105. There may be multiple downlink carriers. Each UE 115 may measure or otherwise estimate the channel quality on each downlink carrier. Each UE 115 may transmit this estimated channel quality information to a Node B 105 in the manner described herein.

The RNCs 120 provide control functionalities for one or more Node Bs 105. The RNCs 120 are coupled to a public switched telephone network (PSTN) 205 through mobile switching centers (MSC) 210. In another example, the RNCs 120 are coupled to a packet switched network (PSN) (not shown) through a packet data server node (PDSN) (not shown). Data interchange between various network elements, such as the RNCs 120 and a packet data server node, can be implemented using any number of protocols, for example, the Internet Protocol (IP), an asynchronous transfer mode (ATM) protocol, T1, E1, frame relay, or other protocols.

Each RNC 120 fills multiple roles. First, it may control the admission of new UEs 115 or services attempting to use the Node B 105. Second, from the Node B 105, or base station, point of view, the RNC 120 may be a controlling RNC 120. Controlling admission ensures that UEs 115 are allocated radio resources (bandwidth and signal/noise ratio) up to what the network has available. The RNC 120 is where the Node B's 105 Iub interface terminates. From the UE 115 point of view, the RNC 120 acts as a serving RNC 120 in which it terminates the UE's 115 link layer communications. From a core network 125 point of view, the serving RNC 120 terminates the Iu for the UE 115. The serving RNC 120 also controls the admission of new UEs 115 or services attempting to use the core network 125 over its Iu interface.

For an air interface, UMTS often uses a wideband spread-spectrum mobile air interface known as Wideband Code Division Multiple Access (or W-CDMA). W-CDMA uses a direct sequence code division multiple access signaling method (or CDMA) to separate users. W-CDMA is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each UE 115 uses an orthogonal variable spreading factor (OVSF) code. An OVSF code is an orthogonal code that facilitates uniquely identifying individual communication channels. In addition, micro diversity is supported using soft handover, and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is that a receiver aligns its PN sequences to those of the Node Bs 105.

Some systems, such as those defined by the W-CDMA standard, differentiate Node Bs 105 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 105 operate asynchronously in relation to each other, so knowledge of the frame timing of one Node B 105 does not translate into knowledge of the frame timing of any other Node B 105. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses three enhancements to improve data rate. First, it introduced support for MIMO on the downlink. Second, higher order modulation is introduced on the downlink. Third, higher order modulation is introduced on the uplink.

In HSUPA, the Node B 105 allows several UEs 115 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a Node B 105 of an access network sends downlink payload data to UEs 115 on High Speed Downlink Shared Channel (HS-DSCH), and the control information associated with the downlink data on High Speed Shared Control Channel (HS-SCCH). There are, in some examples, 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmit time interval (TTI), the dedicated control information sent to an HSDPA-enabled UE 115 indicates to the device which codes within the code space will be used to send downlink payload data (data other than control data of the radio network) to the device, and the modulation that will be used for transmission of the downlink payload data.

With HSDPA operation, downlink transmissions to the UEs 115 may be scheduled for different transmission time intervals using a number of available HSDPA OVSF codes. For a given TTI, each UE 115 may be using one or more of the HSDPA codes, depending on the downlink bandwidth allocated to the device during the TTI.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. A transmission pipe does not correspond to an antenna transmission chain or any one particular transmission path.

Communication systems may use a single carrier frequency or multiple carrier frequencies. Each link may incorporate a different number of carrier frequencies. Furthermore, a UE 115 may be any data device that communicates through a wireless channel or through a wired channel, for example using fiber optic or coaxial cables. A UE 115 may be any of a number of types of devices including but not limited to PC card, compact flash, external or internal modem, or wireless or wireline phone.

UE 115 that has established an active traffic channel connection with one or more Node Bs 105 is called active UE 115, and is said to be in a traffic state. UE 115 that is in the process of establishing an active traffic channel connection with one or more Node Bs 105 is said to be in a connection setup state. The communication link through which the UE 115 sends signals to the Node Bs 105 is called an uplink 235. The communication link through which Node Bs 105 send signals to a UE 115 is called a downlink 240.

Figure 3:
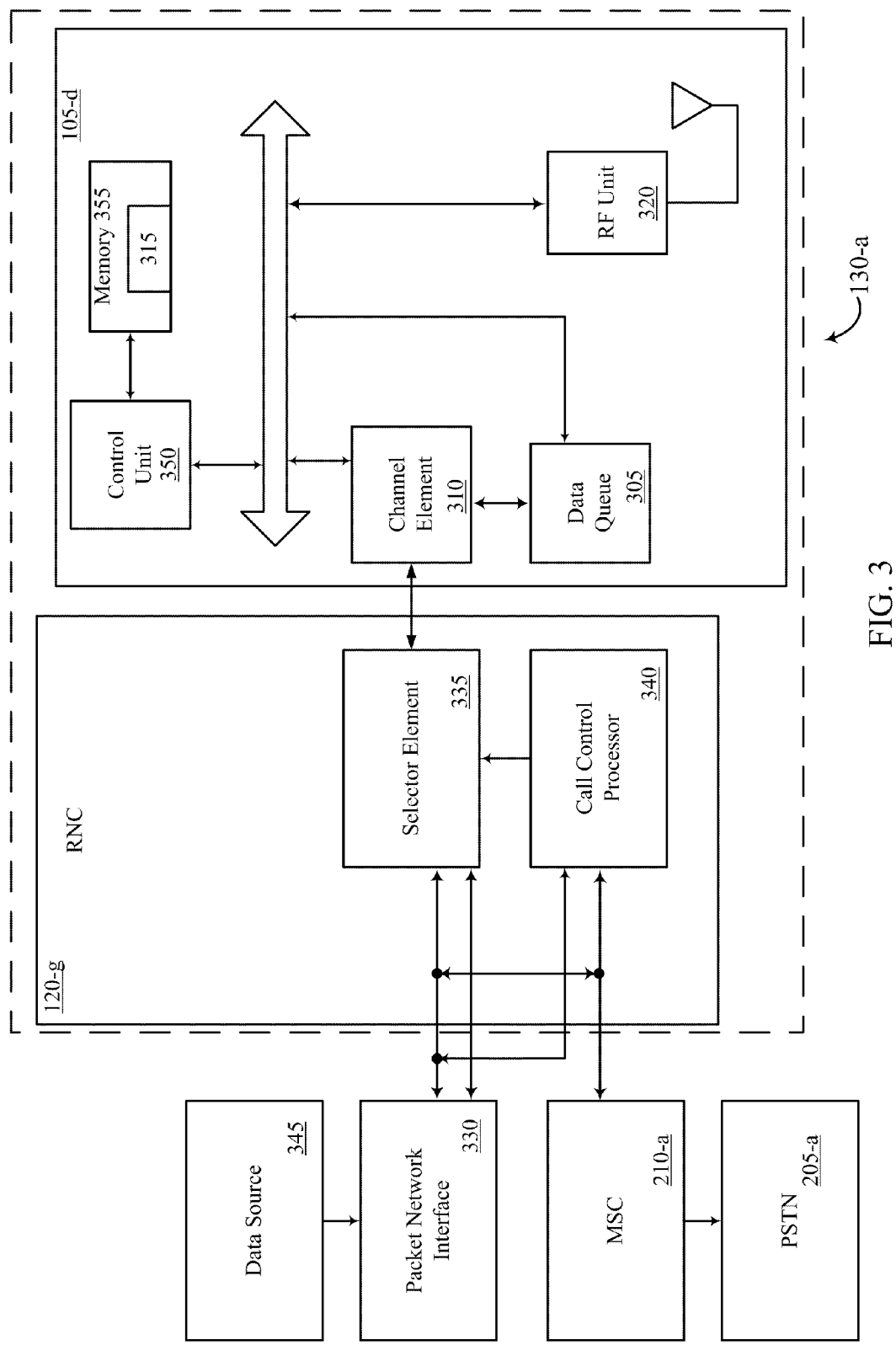
FIG. 3 is a block diagram of a portion of the communication system where a Node B and a radio network controller interface with a packet network interface.

FIG. 3 is detailed herein below, and provides an example wherein a Node B 105-d and RNC 120-g are in communication with a packet network interface 330. (In FIG. 3, only one of the Node Bs 105 and only one RNC 120 is shown for simplicity). The Node B 105-d and RNC 120-g may be part of a radio network 130-a (e.g., UTRAN 130 of FIG. 1), shown in FIG. 3 as a dotted line surrounding one or more Node Bs 105 and the RNC 120. The associated quantity of data to be transmitted is retrieved from a data queue 305 in the Node B 105-d and provided to the channel element 310 for transmission to the UE 115 associated with the data queue 305.

The RNC 120-g interfaces with the Public Switched Telephone Network (PSTN) 205-a through a mobile switching center 210-a. Also, RNC 120-g interfaces with Node Bs 105 in the radio network 100 (only one Node B 105 is shown in FIG. 3 for simplicity). In addition, the RNC 120-g interfaces with a packet network interface 330. The RNC 120-g coordinates the communication between the UE 115 in the radio network 100 and other users connected to packet network interface 330 and PSTN 205-a. The PSTN 205-a interfaces with users through a standard telephone network (not shown in FIG. 3).

The RNC 120-g contains many selector elements 335, although only one is shown in FIG. 3 for simplicity. Each selector element 335 is assigned to control communication between one or more Node Bs 105 and one UE 115 (not shown). If the selector element 335 has not been assigned to a given UE 115, a call control processor 340 is informed of the desire to page the UE 115. The call control processor 340 directs the Node B 105-d to page the UE 115.

Data source 345 contains a quantity of data which is to be transmitted to a given UE 115. The data source 345 provides the data to the packet network interface 330. The packet network interface 330 receives the data and routes the data to the selector element 335. The selector element 335 transmits the data to the Node B 105-d in communication with the target UE 115. In the exemplary embodiment, each Node B 105 maintains a data queue 305 which stores the data to be transmitted to the UE 115.

For each data packet, a channel element 310 inserts the control fields. The channel element 310 performs a cyclic redundancy check, CRC, encoding of the data packet and control fields and inserts a set of code tail bits. The data packet, control fields, CRC parity bits, and code tail bits comprise a formatted packet. The channel element 310 encodes the formatted packet and interleaves (or reorders) the symbols within the encoded packet. The interleaved packet is covered with a Walsh code, and spread with the short PNI and PNQ codes. The spread data is provided to RF unit 320 which quadrature modulates, filters, and amplifies the signal. The downlink signal is transmitted over the air through an antenna to the downlink. The memory 355 of Node B 105-d may include random access memory (RAM) and read-only memory (ROM). The control unit 350 may be an intelligent hardware device, e.g., a central processing unit (CPU) such as those made by Intel® Corporation or AMD®, a microcontroller, an application specific integrated circuit (ASIC), etc. The Node B 105-d may store, e.g., in the memory 355, computer-readable, computer-executable software code 315 containing instructions that are configured to, when executed, cause the control unit 350 to perform Node B functionality described herein.

At the UE 115, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 105-d, specifically the de-interleaving, decoding, and CRC check functions. The decoded data is provided to a data sink.

Figure 4:
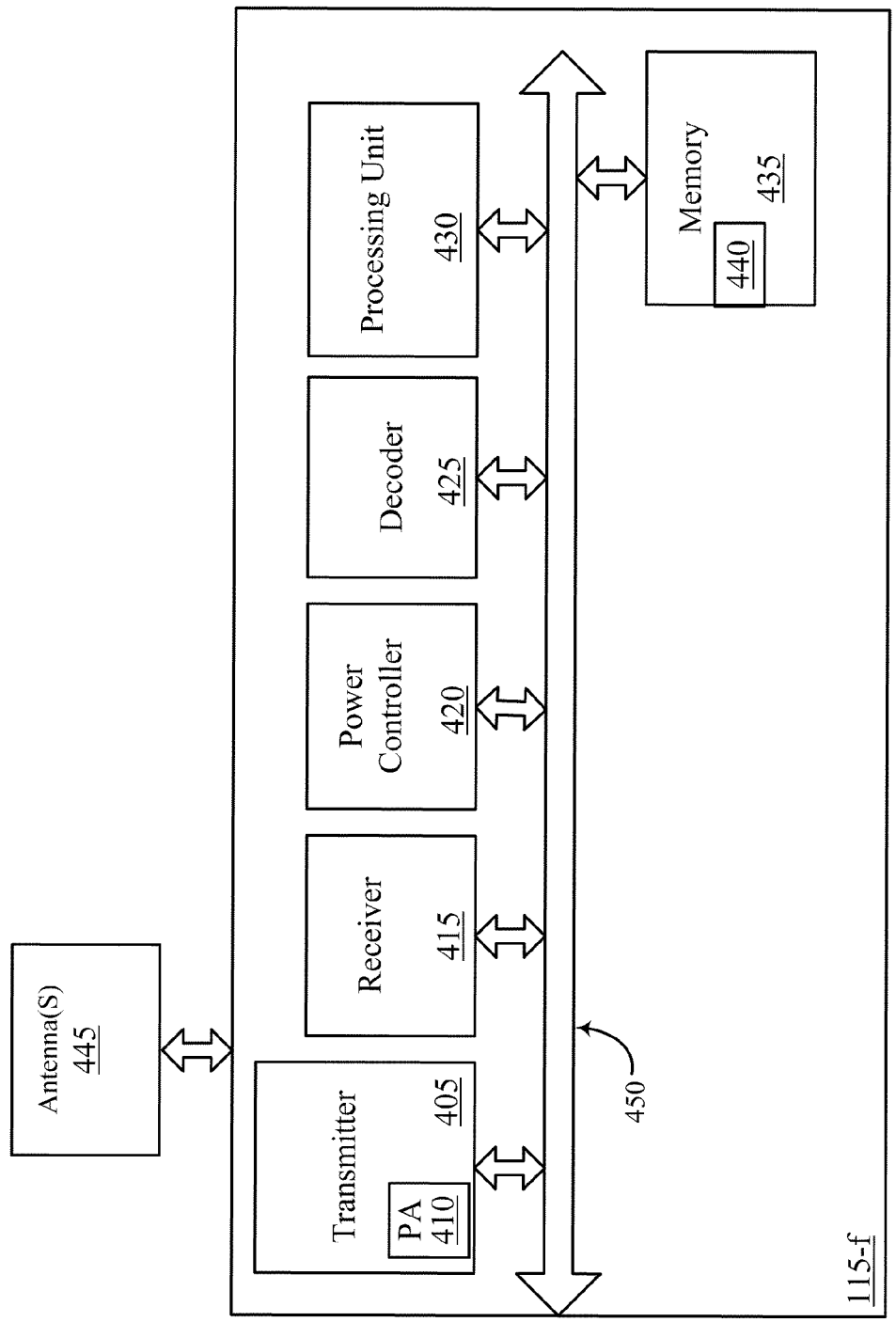
FIG. 4 is a block diagram of the user equipment (UE).

FIG. 4 is a block diagram 400 illustrating an example of a user equipment (UE) 115-f in which the UE 115-f includes transmit circuitry 405 (including PA 410), receive circuitry 415, power controller 420, decode processor 425, a processing unit 430 for use in processing signals, memory 435, and one or more antennas. The transmit circuitry 405 and the receive circuitry 415 may allow transmission and reception of data, such as audio communications, between the UE 115-f and a remote location. The transmit circuitry 405 and receive circuitry 415 are coupled to an antenna(s) 445.

The processing unit 430 controls operation of the UE 115-f. The processing unit 430 may also be referred to as a CPU. The processing unit 430 may measure channel quality information for a number of downlink carriers. The processing unit 430 may configure an uplink control channel based on the number of activated carriers, and whether those carriers are configured with MIMO. Thus, a processing unit 430 may flexibly configure the frame structure, encoding, and mapping based on the number of activated carriers. The memory 435, which may include both read-only memory (ROM) and random access memory (RAM), provides instructions and data to the processing unit 430. A portion of the memory 435 may also include non-volatile random access memory (NVRAM).

The various components of the UE 115 are coupled together by a bus system 450 which may include a power bus, a control signal bus, and a status signal bus in addition to a data bus. For the sake of clarity, the various busses are illustrated in FIG. 4 as the bus system 450.

The steps of the methods discussed may also be stored as instructions in the form of software or firmware 440 located in the memory 435 in the Node B 105. These instructions may be executed by the control unit 350 of Node B 105 in FIG. 3. Alternatively, or in conjunction, the steps of the methods discussed may be stored as instructions in the form of software or firmware 440 located in the memory 435 in the UE 115. These instructions may be executed by the processing unit 430 of the UE 115 in FIG. 4.

Figure 5:
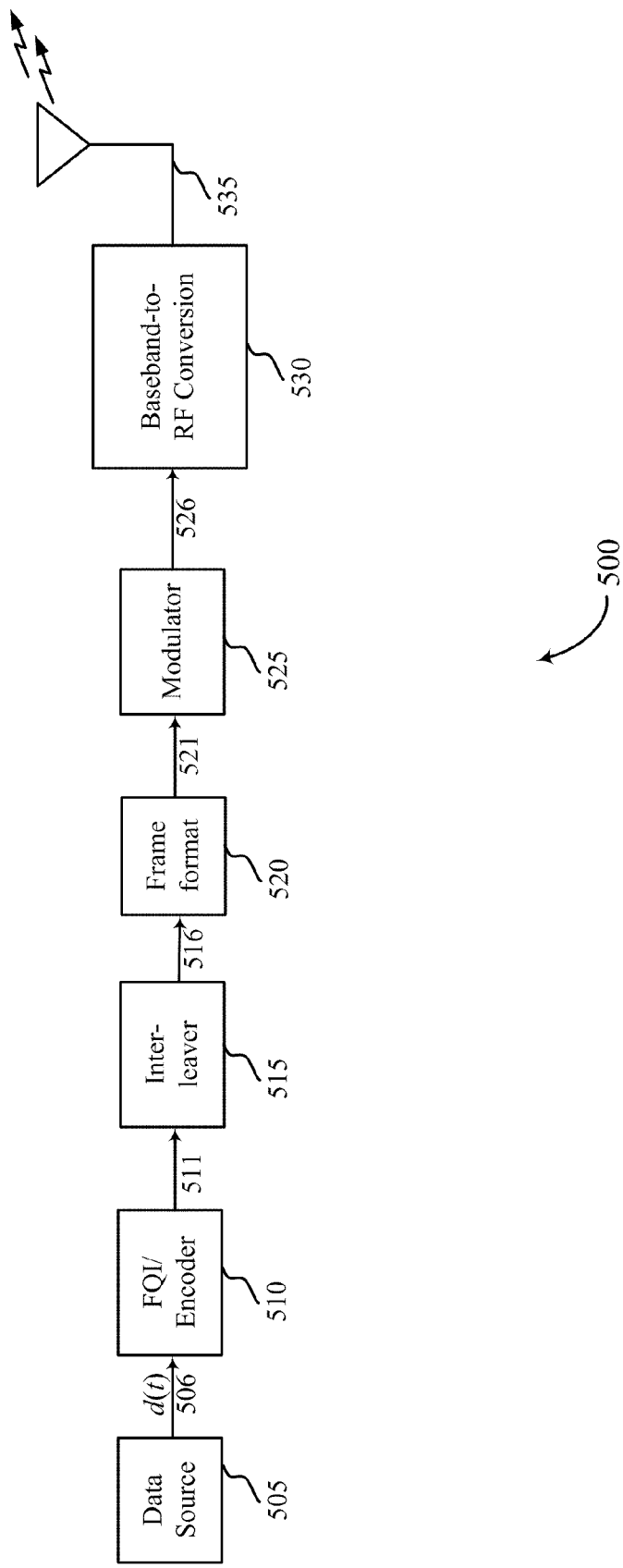
FIG. 5 is a functional block flow diagram of signals through structures of a transmitter.

FIG. 5 illustrates an example functional block flow diagram 500 for a transmission from a UE 115. A data source 505 provides data d(t) 506 to an FQI/encoder 510. The FQI/encoder 510 may append a frame quality indicator (FQI) such as a cyclic redundancy check (CRC) to the data d(t) 506. The FQI/encoder 510 may further encode the data and FQI using one or more coding schemes to provide encoded symbols 511. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes. The FQI/encoder 510 may, in one example, flexibly configure the frame structure, encoding, and mapping based on the number of activated carriers.

An interleaver 515 interleaves the encoded data symbols 511 in time to combat fading, and generates symbols 516. The interleaved symbols of signal 516 may be mapped by a frame format block 520 to a pre-defined frame format to produce a frame 521. A frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 516 are segmented into a plurality S of sub-segments making up a frame 521.

A frame format may further specify the inclusion of, e.g., control symbols (not shown) along with the interleaved symbols 516. Such control symbols may include, e.g., power control symbols, frame format information symbols, etc.

A modulator 525 modulates the frame 521 to generate modulated data 526. Examples of modulation techniques include binary phase shift keying (BPSK) and quadrature phase shift keying (QPSK). The modulator 525 may also repeat a sequence of modulated data.

A baseband-to-radio-frequency (RF) conversion block 530 may convert the modulated signal 526 to RF signals for transmission via one or more antenna(s) 535 as signal 536 over a wireless communication link to one or more Node Bs 105.

Figure 6:
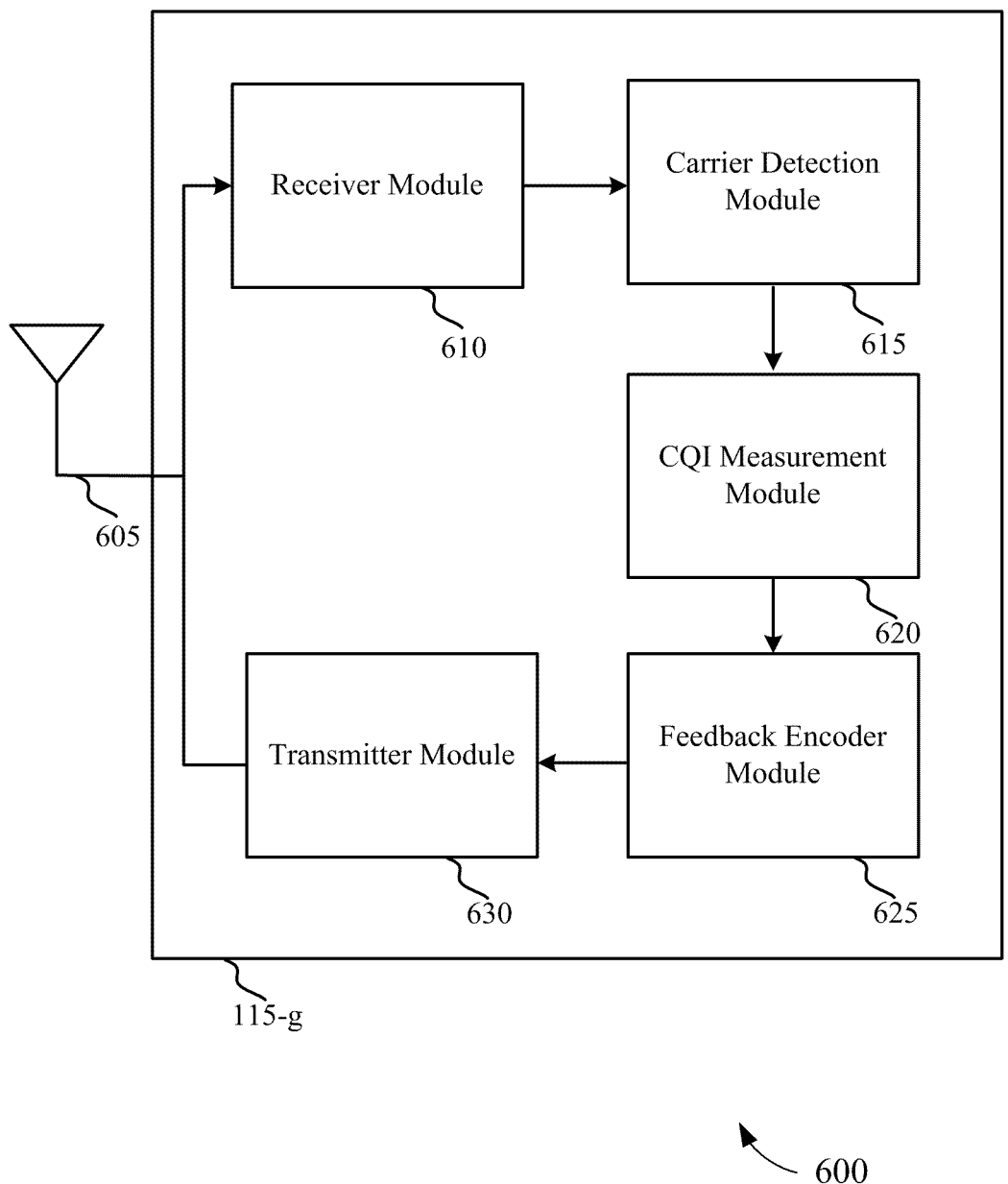
FIG. 6 is a block diagram of a mobile terminal

Turning next to FIG. 6, a block diagram illustrates an example of a mobile terminal 115-g, which may be adapted so as to flexibly configure an uplink control channel. This mobile terminal 115-g may be a UE 115 as described with reference to FIG. 1, 2, or 4, implemented in the system 100 of FIG. 1 or system 200 of FIG. 2.

The mobile terminal 115-g includes one or more antennas 605, a receiver module 610, a carrier detection module 615, a CQI measurement module 620, a feedback encoder module 625, and a transmitter module 630, which each may be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 610 may receive wireless signals (e.g., transmitted from a Node B 105 of FIG. 1, 2, or 3) via one or more antennas 605. These wireless signals may be payload data on a High Speed Downlink Shared Channel (HS-DSCH) and/or control information associated with the downlink data on High Speed Shared Control Channel (HS-SCCH). The carrier detection module 615 may identify the number of activated carriers, and further identify when the number of activated carriers has changed.

The CQI measurement module 620 may estimate channel quality information for each of the identified downlink carriers. The feedback encoder module 625 is adapted to configure and/or modify an uplink control channel based on a number of activated downlink carriers, among other factors. Thus, the configuration of the uplink control channel may be flexibly adapted based on the number of activated carriers. The feedback encoder module 625 may encode downlink channel quality information and acknowledgment information for transmission on the uplink. The transmitter module 630 may transmit the downlink channel quality information on each carrier and acknowledgement information (e.g., transmitting the information to a Node B 105 of FIG. 1, 2, or 3).

This flexible configuration may take a variety of forms. For example, as will be addressed in more detail below, the feedback encoder module 625 may repeat codewords when certain numbers of carriers are active, and transmit different codewords when other numbers of carriers are active. In one example, codewords are repeated in one or more slots of a transmit timing interval when there are certain numbers of activated carriers, while different codewords are used for the one or more slots of the transmit timing interval when there are larger numbers of activated carriers. The feedback encoder module 625 may reduce transmission power in the mobile device when a codeword is repeated. While some aspects are flexible, the feedback encoder module 625 may maintain a constant feedback cycle when different numbers of carriers are activated.

There are a number examples of using repetition in a flexible manner, in relation to both channel quality information and acknowledgement information. In some examples (e.g., assuming that there are two of four carriers activated), the feedback encoder module 625 may group channel quality information for a carrier in a single codeword, and repeat the codeword in two successive slots of a transmit timing interval. When there are additional activated carriers (e.g., when all four carriers are activated), the feedback encoder module 625 may encode channel quality information for a first carrier in a codeword and channel quality information for a second carrier in a different codeword, and group those codewords for transmission within two successive slots of the transmit timing interval.

In another set of examples (e.g., assuming that there are four of four carriers activated), the feedback encoder module 625 may encode acknowledgement information for a first carrier and a second carrier using a first codeword and acknowledgement information for a third carrier and a fourth carrier using a second codeword. The feedback encoder module 625 may group the first codeword and the second codeword for transmission within a slot of a transmit timing interval. When there are fewer activated carriers (e.g., when two of four carriers are activated), the feedback encoder module 625 may encode acknowledgement information for two carriers using a different codeword, and repeat the codeword within the slot of the transmit timing interval. In still another example, there are three activated carriers (e.g., when three of four carriers are activated), and the feedback encoder module 625 may encode acknowledgement information for a first carrier and a second carrier using a codeword and acknowledgement information for a third carrier using a second codeword, and group these codewords for transmission within a slot of a transmit timing interval (e.g., each codeword using a half slot).

The feedback encoder module 625 may modify an uplink control channel based on whether one or more of activated carriers are configured with MIMO. For example, the feedback encoder module 625 may use different codewords depending on whether the activated carriers are configured with MIMO. The feedback encoder module 625 may also use different spreading factors for given portions of a transmit timing interval depending on the number of activated carriers. A spreading factor used for channel quality information or acknowledgement information may, in one example, be 128 or 256 depending on the number of activated carriers. The feedback encoder module 625 may also map carriers to different portions of a transmit timing interval depending on the number of activated carriers. This mapping flexibility may be related to channel quality information or acknowledgement information slots.

On another example, the feedback encoder module 625 may maintain logical sequential ordering even as carriers are deactivated. Assume that there are four carriers activated, the four carriers associated with a logical sequential order. When one or more of the carriers are deactivated, the logical sequential order of the remaining active carriers may be preserved in the uplink control channel.

In another example, the CQI measurement module 620 is configured to identify activation of an additional carrier, and the feedback encoder module 625 is configured to modify configuration of the uplink control channel responsive to the activation of the additional carrier.

Figure 7:
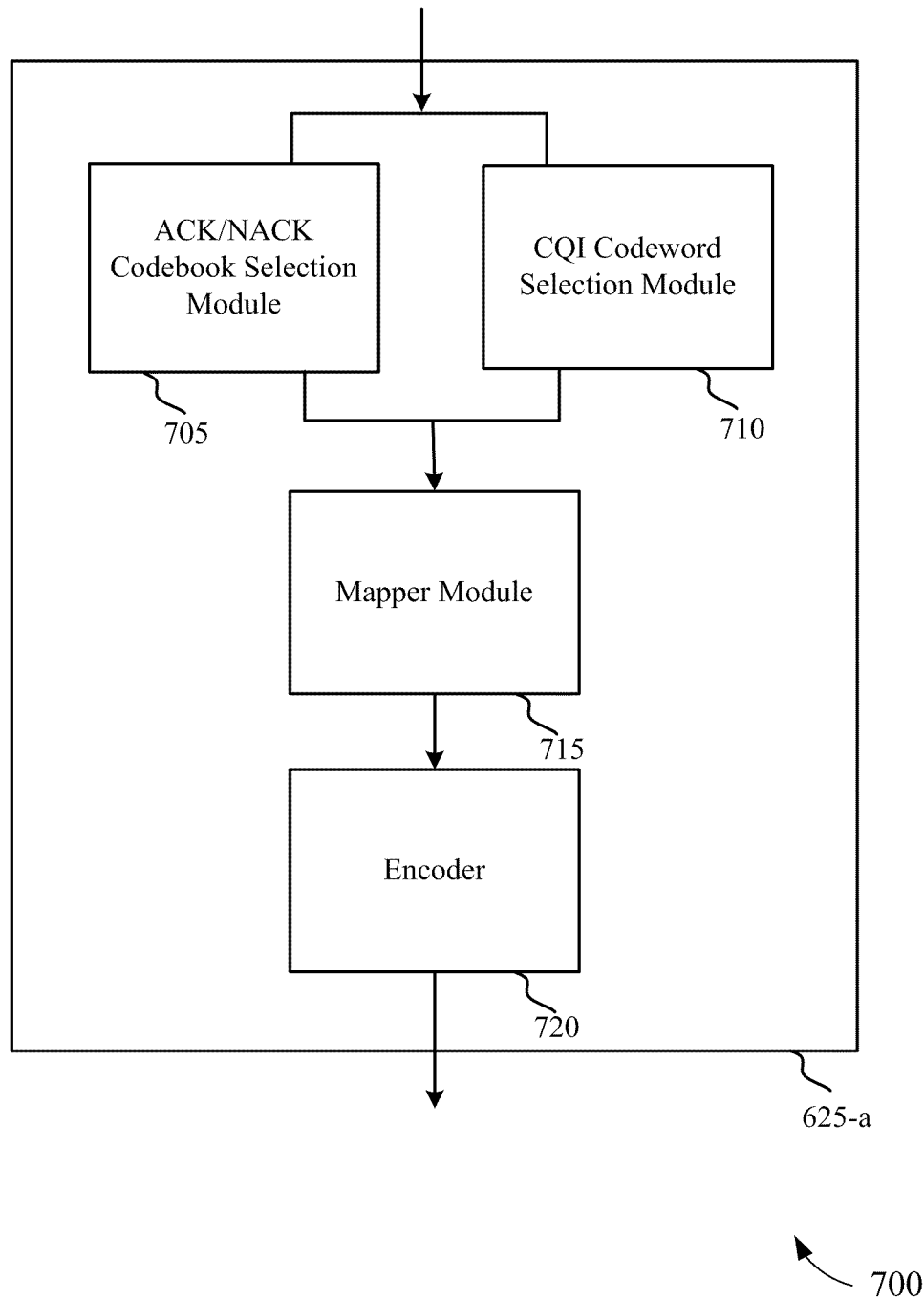
FIG. 7 is a block diagram of an encoder module for a mobile terminal.

Turning next to FIG. 7, a block diagram 700 illustrates an example of an encoder module 625-*a* that may be implemented, for example, in the mobile terminal 115-*g* of FIG. 6. This encoder module 625-*a* may also be implemented in a UE 115 as described with reference to FIG. 1, 2, or 4, implemented in the system 100 of FIG. 1 or system 200 of FIG. 2.

The encoder module 625-*a* includes an ACK/NACK codebook selection module 705, a CQI codeword selection module 710, a mapper module 715, and an encoder 720. The encoder module 625-*a* may receive an identification of the number of activated carriers, along with downlink channel quality information for each carrier and acknowledgement information.

The ACK/NACK codebook selection module 705 may receive the identification of the number of activated carriers, along with acknowledgement information. Based on the number of carriers and perhaps other factors (e.g., whether each carrier is configured with MIMO), the ACK/NACK codebook selection module 705 may select the encoding scheme (e.g., which codebooks and spreading factor) to use for the acknowledgement. The coding scheme, code repetition, spreading factor, and power use may be varied depending on the number of activated carriers.

The CQI codeword selection module 710 may receive the identification of the number of activated carriers, along with downlink channel quality information for each carrier. Based on the number of carriers and perhaps other factors (e.g., whether each carrier is configured with MIMO), the CQI codeword selection module 710 may select the encoding scheme (e.g., which codewords and spreading factor) to use for the CQI transmission on the uplink. The coding scheme, code repetition, spreading factor, and power use may be varied depending on the number of activated carriers.

The mapper module 715 may map the downlink channel quality information for each carrier and acknowledgement information to different slots, depending on the number of activated carriers. In some instances, the logical sequential order of remaining active carriers may be preserved in the uplink control channel when carriers are deactivated. The encoder 720 may encode the data to be transmitted according to the selections by the ACK/NACK codebook selection module 705, CQI codeword selection module 710, and mapper module 715.

As described above, HSDPA is an enhanced 3G mobile telephony communications protocol, which allows networks based on UMTS to have higher data transfer speeds and capacity. HSDPA may support multiple downlink carriers. In a version known as four-carrier HSDPA, the uplink control channel transmitted by a UE may be required to contain feedback information such as ACK/NAK or CQI information for up to four downlink carriers. Each downlink carrier may be configured as a multiple-input multiple-output (MIMO) carrier or a non-MIMO carrier. To transmit such feedback information, the symbols of the HS-DPCCH channel may be spread using a spreading factor of 128. In this case, 20 code symbols are available per slot to carry the feedback information, as opposed to 10 code symbols if a spreading factor of 256 is used, as in releases of the W-CDMA standard up to Rel-9.

For transmission of the feedback information in 4C-HSDPA, the codebooks for SC- or DC-HSDPA (i.e., single carrier or dual carrier non-MIMO) and SC- or DC-MIMO (i.e., single-carrier or dual-carrier MIMO) currently found in the existing W-CDMA standard may advantageously be re-utilized.

In the following examples, flexibility related to the uplink transmission of channel quality and acknowledgement information is illustrated. In the examples, up to four downlink carriers may be activated. However, as evident to those skilled in the art, there may be more, or fewer, carriers in other examples.

For HSDPA, the HS-DPCCH carries acknowledgment information and a current channel quality indicator of the user. This may be used by the Node B to calculate how much data to send to the UE on the next transmission. In the following example, a HSDPA system is used for purposes of example (e.g., the system 100 of FIG. 1 or system 200 of FIG. 2, wherein a UE 115 transmits to a Node B 105 on a HS-DPCCH channel). However, this is for purposes of example only, and novel aspects may be implemented in a number of different systems.

In various examples below, there may be two, three, or four downlink carriers activated at a time. All, some, or none of the carriers may be configured with MIMO. The configuration of the uplink control channel may vary depending upon the number of activated carriers, and the number of those carriers configured with MIMO. Various spreading factors (e.g., 128 or 256) may be used. In one example, regardless of the configuration (two, three, or four carriers, each with, or without, MIMO), the feedback cycle remains constant. The feedback cycle identifies the number of TTIs between each transmission of CQI for a carrier. Various techniques are described that may result in power saving (e.g., by repeating information for certain carriers, or combining information for certain carriers).

Figure 8:
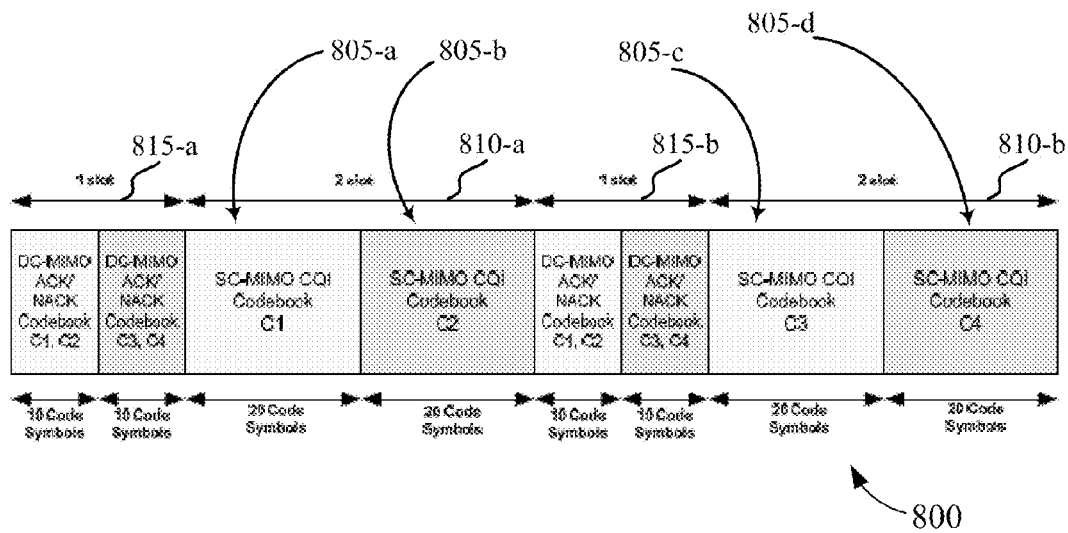
FIG. 8 is a block diagram of a control channel configuration for transmitting channel quality information (CQI) and acknowledgement data when four MIMO carriers are activated.

The following scenarios illustrate a HS-DPCCH configuration for channel quality information and/or acknowledgement information when different numbers of carriers are activated. The following examples assume that there may be up to four carriers activated, but in other examples there may be other numbers of carriers. In some examples, the feedback cycle is two, although it is worth emphasizing that the feedback cycle may differ in other examples:

Referring to FIG. 8, consider a design wherein all four downlink carriers are activated, and are configured with MIMO (denoted by C1, C2, C3 and C4). Precoding control indication (PCI) and CQI data is reported for each carrier, and a spreading factor of 128 is used. FIG. 8 illustrates the example configuration 800 of two TTIs. In this scenario, the CQI feedback 805 is transmitted in a TDM fashion for each carrier. All the carriers are configured with MIMO, the CQI coding scheme uses a single carrier CQI (20, 10) code (using SC-MIMO CQI codebooks in this example). The feedback cycle in this configuration is two (which may be 4 ms, since one TTI is of 2 ms duration). The PCI and the CQI data pertaining to a carrier are sent in the same CQI codeword and correspond to that carrier (codeword 805-*a* for C1, codeword 805-*b* for C2, codeword 805-*c* for C3, codeword 805-*d* for C4).

In this example, there is no repetition for the CQI data within a TTI, as the CQI codewords for C1 and C2 are grouped for successive transfer in the first TTI 810-*a*, and codewords for C3 and C4 are grouped for successive transfer in the second TTI 810-*b*. In this example, there is no repetition for the ACK/NACK information in a given TTI, and the DC-MIMO codebooks may be used. The acknowledgement information for C1 and C2 are combined and jointly encoded in an ACK/NACK codeword in a half slot in the first TTI 815-*a*, and acknowledgement information for C3 and C4 are combined and jointly encoded in an ACK/NACK codeword in the second half slot for successive transfer in the first TTI 815-*a*. The use of these codebooks may be repeated in the next TTI 815-*b*.

Turning to the scenario where all four downlink carriers are activated, none are configured with MIMO. PCI and CQI information are reported for each carrier. There are two different example schemes set forth below, and either may be used.

Figure 9:
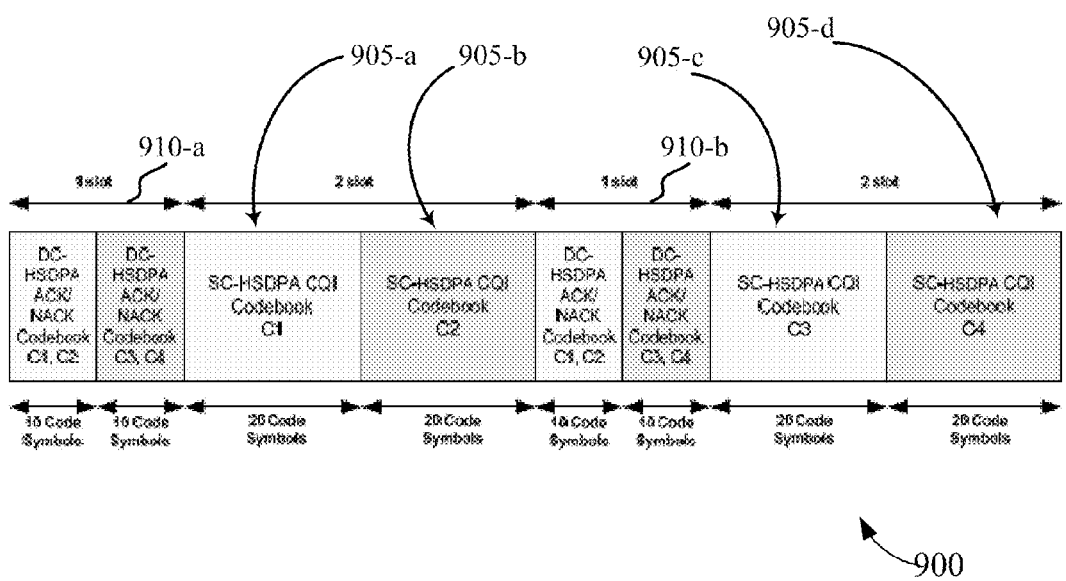
FIG. 9 is a block diagram of a control channel configuration for transmitting CQI and acknowledgement data when four non-MIMO carriers are activated.

FIG. 9 illustrates the example configuration 900 of two TTIs for the four carriers (denoted by C1, C2, C3 and C4). In this scenario, the CQI feedback 905 is transmitted in a TDM fashion for each carrier. The CQI coding scheme uses a single channel CQI (20, 10) code (SC-HSDPA). The feedback cycle in this configuration remains two (which may be 4 ms). The PCI and the CQI information pertaining to a carrier are sent in the same CQI codeword and correspond to that carrier (codeword 905-*a* for C1, codeword 905-*b* for C2, codeword 905-*c* for C3, codeword 905-*d* for C4).

In this example, there is no repetition for the ACK/NACK information in a given TTI, and although DC-HSDPA ACK/NACK codebooks are shown, other codebooks (e.g., the DC-MIMO ACK/NACK codebooks) may be used. The acknowledgement information for C1 and C2 are combined and jointly encoded in an ACK/NACK codeword in a half slot of the first TTI 910-*a*, and acknowledgement information for C3 and C4 are combined and jointly encoded in an ACK/NACK codeword in the second half slot for successive transfer in the first TTI 910-*a*. The use of these codebooks may be repeated in the next TTI 910-*b*.

Figure 10:
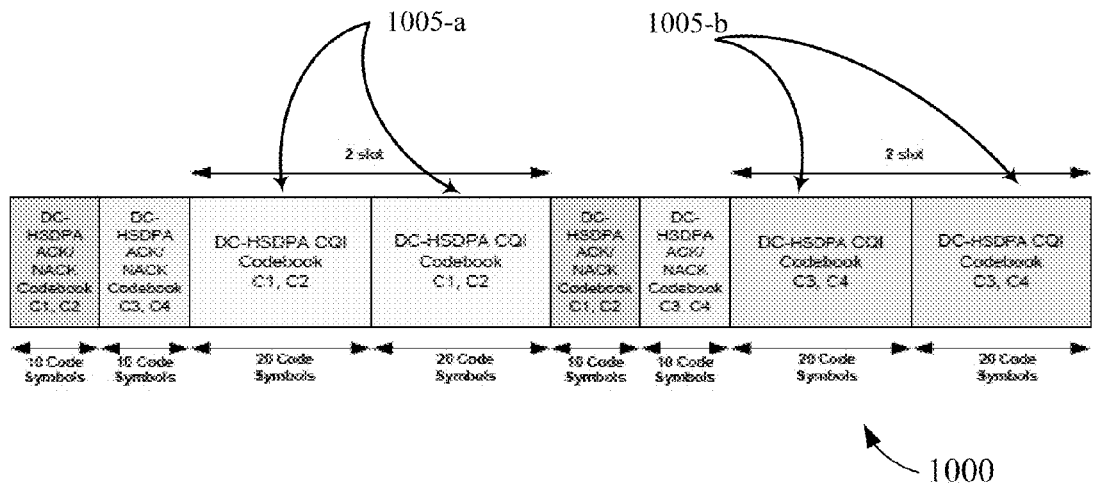
FIG. 10 is a block diagram of an alternative control channel configuration for transmitting CQI and acknowledgement data when four non-MIMO carriers are activated.

FIG. 10 illustrates the example configuration 1000 of two TTIs for the four carriers (denoted by C1, C2, C3 and C4). In this scheme, the CQI configuration is based on grouping carriers C1 and C2 and jointly encoding the CQI information in a single codeword 1005-*a*, which is repeated. Transmission power may be reduced when a codeword is repeated. Similarly, carriers C3 and C4 are grouped together and jointly encoded in a single codeword 1005-*b*, which is repeated. As noted, the CQI for carriers C1 and C2 is repeated to cover both available slots, and the CQI for carriers C3 and C4 is also repeated. This scheme may allow for up to link efficiency gain due to the repetition. Although the beta factors used in the case of HSDPA CQI encoding are 2 dB higher, the gain due to repetition means that a gain of +/−1 dB may be obtained as compared with reporting CQI data in FIG. 9.

Although this scheme is more link efficient when compared to FIG. 9, it may be more complicated since a different CQI configuration can potentially result from each combination of MIMO and non-MIMO carriers. As a result, the CQI configuration would change when one or more carriers are activated or deactivated. This design principle is a "flexible mapping" approach. Different tradeoffs can be employed. For example, different codebooks, spreading factors, repetition, mapping, and joint encoding may be used when there are different numbers of carriers activated, and considering whether MIMO is used. Using these techniques, a constant feedback cycle may be maintained in some examples, and power savings at the UE may result.

Figure 11:
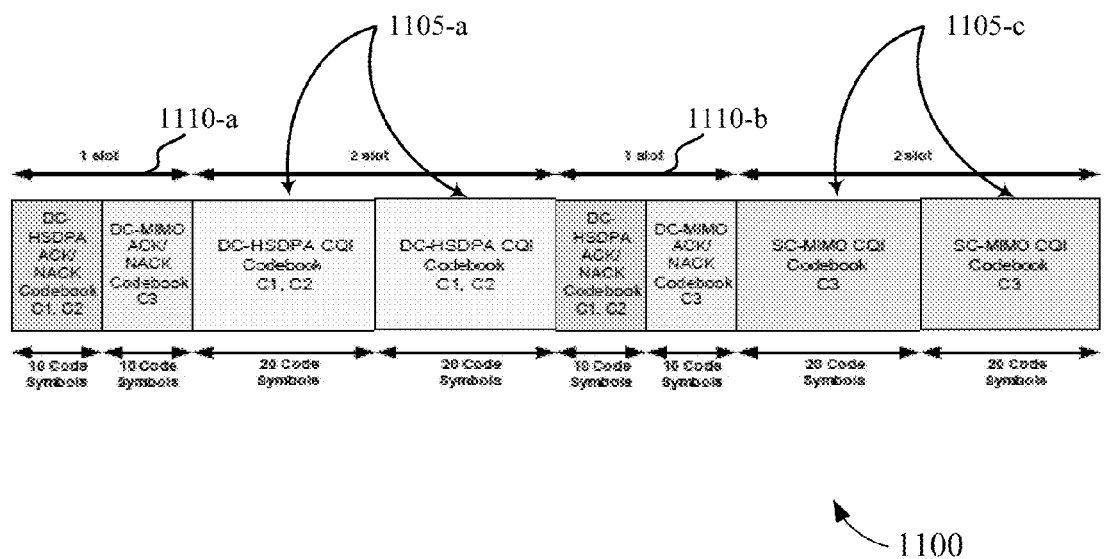
FIG. 11 is a block diagram of a control channel configuration for transmitting CQI and acknowledgement data when three carriers are activated.

Referring to FIG. 11, three downlink carriers are activated, and one is configured with MIMO (denoted by C1, C2, and C3 (MIMO)). Precoding control indication (PCI) and CQI information is reported for C1 and C2 and jointly encoded in codeword 1105-*a*, and repeated, and for C3 alone in codeword 1105-*b*, and repeated. FIG. 11 again illustrates the example configuration 1100 of two TTIs. The feedback cycle in this configuration is two (which may be 4 ms). The configuration is flexible as the mapping and encoding scheme used is varied based on the number of activated carriers. The MIMO CQI is repeated while the two carrier channel quality information encoded into one codeword is also repeated.

In this example, there is no repetition for the ACK/NACK information in a given TTI, and use of DC-HSDPA and DC-MIMO codebooks are shown. In other embodiments, only DC-MIMO codebooks are used for the ACK/NACK information. The acknowledgement information for C1 and C2 are combined and jointly encoded in an ACK/NACK codeword (using a DC-HSDPA codebook) in a half slot the first TTI 1110-*a*, and acknowledgement information for C3 is encoded in an ACK/NACK codeword (using a DC-MIMO codebook) in the second half slot for successive transfer in the first TTI 1110-*a*. The use of these codebooks may be repeated in the next TTI 1110-*b*.

Figure 12:
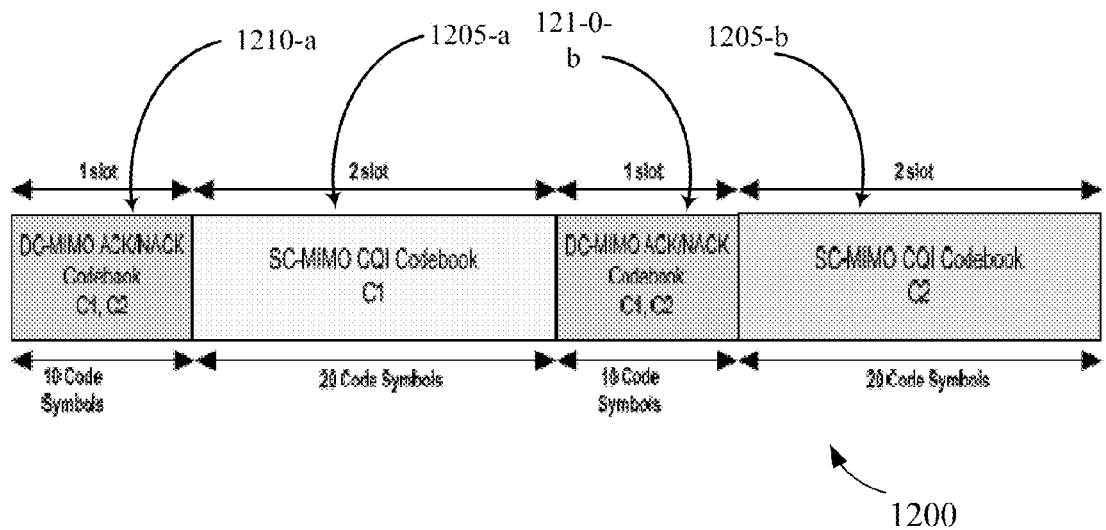
FIG. 12 is a block diagram of a control channel configuration for transmitting CQI and acknowledgement data when two carriers are activated.

Referring to FIG. 12, two downlink carriers are activated, and are configured with MIMO (denoted by C1 and C2). PCI and CQI information are reported for each carrier. FIG. 12 illustrates the example configuration 1200 of two TTIs, and a spreading factor of 256 is used. In this scenario, the CQI feedback 1205 is transmitted in a TDM fashion for each carrier. The feedback cycle in this configuration is two (which may be 4 ms). The PCI and the CQI information pertaining to a carrier are sent in the same CQI codeword and correspond to that carrier (codeword 1205-*a* for C1, codeword 1205-*b* for C2).

Instead of, or in addition to, using the higher spreading factor, CQI data and acknowledgement information may be repeated, which may thereby result in power savings at a UE. CQI data for a dual carrier codebook may be repeated, and/or CQI data for a single carrier codebook may be repeated (e.g., see FIG. 11). This CQI repetition may be for MIMO or non-MIMO carriers.

FIGS. 8-12 thus illustrate examples of how different codebooks, spreading factors, repetition, and joint encoding of CQI data and acknowledgement information may be used to maintain a constant feedback cycle and/or to reduce power consumption. The foregoing examples illustrate flexible mappings of the CQI information of carriers with or without repetitions so as to improve link efficiency in CQI transmission or to power used for transmission.

Turning to FIGS. 13-16, a series of examples are shown illustrating how acknowledgement information may be sent in a slot of a TTI when two downlink carriers are activated. There are four different options set forth below, and any may be used.

Figure 13:
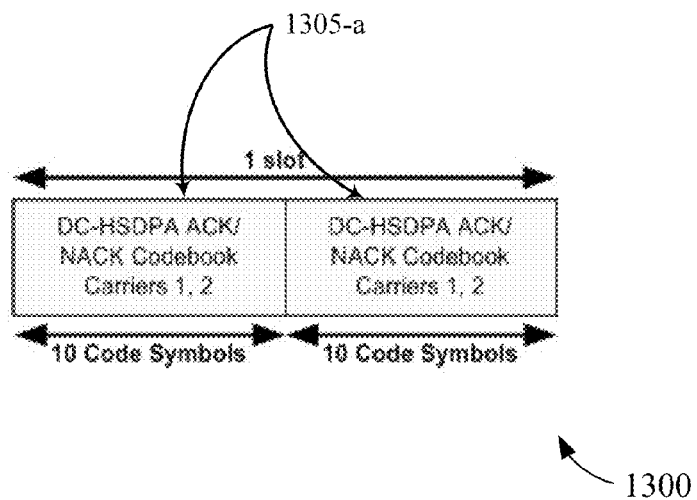
FIGS. 13-16 are block diagrams of various control channel configurations for transmitting acknowledgement data when two carriers are activated.

In these examples, acknowledgment (ACK/NAK) channels for downlink carriers may be accommodated in a single slot of an DPCCH. Referring to FIG. 13, a block diagram 1300 illustrates a first option using SF 128, where acknowledgement information for C1 and C2 are combined and jointly encoded in an ACK/NACK codeword (using a DC-HSDPA codebook) in a half slot in the first TTI 1305-*a* for carriers 1 and 2 in the first 10 code symbols, and further repeated in a second half-slot in the second 10 code symbols. The codebook used in each half-slot may be the same as the codebook used in Rel-8 for DC-HSDPA in a full slot. Other codebooks may be used (e.g., DC-MIMO ACK/NACK codebooks may be used).

Figure 14:
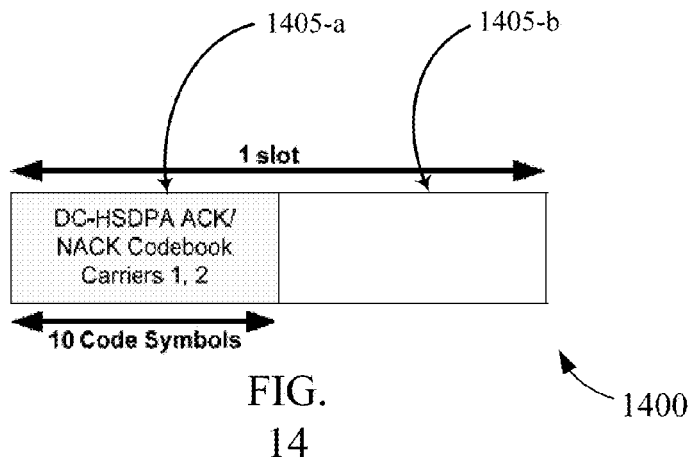

Referring to FIG. 14, a block diagram 1400 illustrates a second option using SF 128, where acknowledgement information for C1 and C2 are combined and jointly encoded in an ACK/NACK codeword (using a DC-HSDPA codebook) in a half slot in the second TTI 1405-*a* for carriers 1 and 2 in the first 10 code symbols. For the second half of the slot, the HS-DPCCH portion of the UE transmissions may be turned off.

Figure 15:
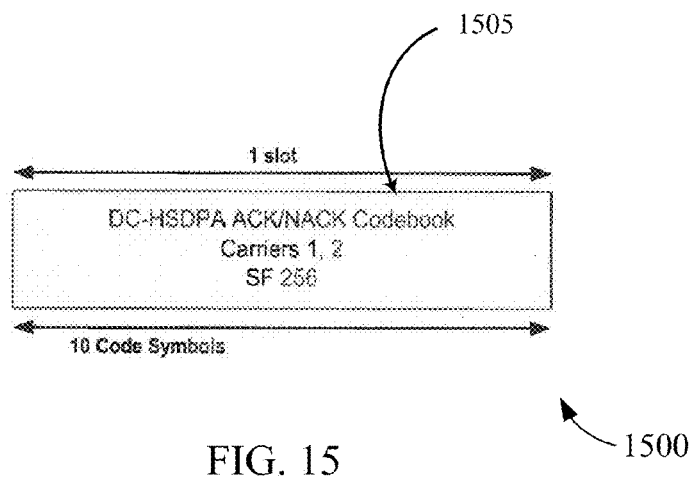

Referring to FIG. 15, a block diagram 1500 illustrates a third option, wherein the acknowledgement information for carriers 1 and 2 are transmitted for the whole slot 1505 using SF 256. The ACK/NAKs for carriers 1 and 2 may be transmitted using the same as the codebook used in Rel-8 for DC-HSDPA. According to the third option, the spreading factor may thus be changed per slot depending on the number of carriers being received at the time.

Figure 16:
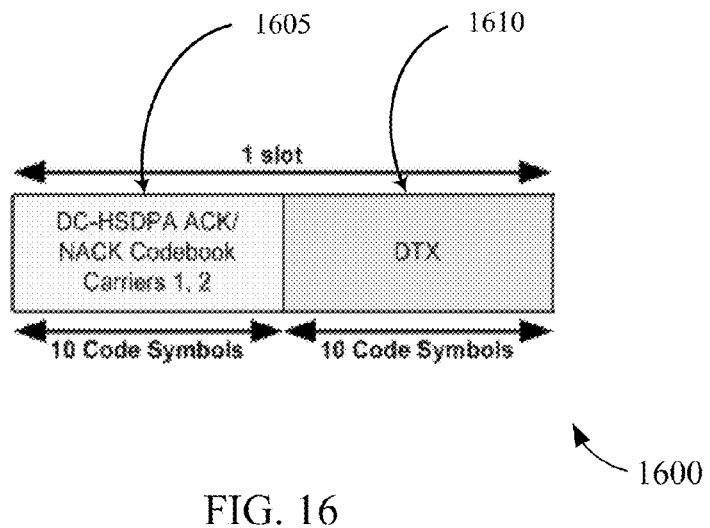

Turning to FIG. 16, block diagram 1600 illustrates a fourth option, where the acknowledgement information for carriers 1 and 2 is transmitted in the first 10 code symbols 1605. In the second 10 code symbols, a codeword 1610 signifying a discontinuous transmission (or "DTX") for the other two carriers (e.g., carriers 3 and 4) may be transmitted. A DC-HSDPA or DC-MIMO codebook may, for example, be modified to include such an additional codeword.

One of ordinary skill in the art will appreciate that modifications to the channel structures for acknowledgement information shown in FIGS. 13-16 may readily be made to accommodate the case wherein the two carriers detected by the UE instead include carriers 3 and 4, rather than carriers 1 and 2.

There are a number of different ways in which legacy codebooks (e.g., ACK/NAK codebooks up to Rel-9) may be mapped to the HS-DPCCH channel when 3 DL carriers (MIMO and/or non-MIMO) are configured for operation, and Table 1 provides one illustration:

TABLE 1

Mapping of legacy codebooks to activated carriers; 3 DL carriers configured

| Number of Activated DL Carriers | Number of MIMO Configured Carriers | HS-DPCCH Mapping |
| --- | --- | --- |
| 1 | 0 | 1x SF256: SC Codebook |
| 1 | 1 | 1x SF256: SC-MIMO Codebook |
| 2 | 0 | 1x SF256: DC-HSDPA Codebook |
| 2 | 1 | 1x SF256: DC-MIMO Codebook |
| 2 | 2 | 1x SF256: DC-MIMO Codebook |
| 3 | 0 | Option 1: DC-HSDPA + SC-HSDPA |
|   |   | Option 2: 1xSF256: 3C HSDPA codebook |
| 3 | 1 | DC-HSDPA: 2 non-MIMO carriers |
|   |   | SC-MIMO: 1 MIMO Carrier |
| 3 | 2 | DC-MIMO: 1 MIMO + 1 non-MIMO Carrier |
|   |   | SC-MIMO: 1 MIMO |
| 3 | 3 | DC-MIMO: 2 MIMO Carriers |
|   |   | SC-MIMO: 1 MIMO Carrier |

Table 2 further provides an example of how legacy codebooks may be mapped to the HS-DPCCH channel when 4 DL carriers (MIMO and/or non-MIMO) are configured for operation.

TABLE 2

Mapping of legacy codebooks to activated carriers; 4 DL carriers configured

| Number of Activated DL Carriers | Number of MIMO Configured Carriers | HS-DPCCH Mapping |
| --- | --- | --- |
| 1 | 0 | 1x SF256: SC Codebook |
| 1 | 1 | 1x SF256: SC-MIMO Codebook |
| 2 | 0 | 1x SF256: DC-HSDPA Codebook |
| 2 | 1 | 1x SF256: DC-MIMO Codebook |
| 2 | 2 | 1x SF256: DC-MIMO Codebook |
| 3 | 0 | Option 1: DC-HSDPA + SC-HSDPA |
|   |   | Option 2: 1xSF256: 3C HSDPA codebook |
| 3 | 1 | DC-HSDPA: 2 non-MIMO carriers |
|   |   | SC-MIMO: 1 MIMO Carrier |
| 3 | 2 | DC-MIMO: 1 MIMO + 1 non-MIMO Carrier |
|   |   | SC-MIMO: 1 MIMO |
| 3 | 3 | DC-MIMO: 2 MIMO Carriers |
|   |   | SC-MIMO: 1 MIMO Carrier |
| 4 | 0 | DC-HSDPA: 2 Non-MIMO Carriers |
|   |   | DC-HSDPA: 2 Non-MIMO Carriers |
| 4 | 1 | DC-HSDPA: 2 Non-MIMO carriers |
|   |   | DC-MIMO: 1 MIMO Carrier and 1 Non-MIMO Carrier |
| 4 | 2 | DC-MIMO: 1 MIMO + 1 non-MIMO Carrier |
|   |   | DC-MIMO: 1 MIMO + 1 non-MIMO Carrier |
| 4 | 3 | DC-MIMO: 1 MIMO + 1 Non-MIMO Carrier |
|   |   | DC-MIMO: 2 MIMO Carriers |
| 4 | 4 | DC-MIMO: 2 MIMO Carriers |
|   |   | DC-MIMO: 2 MIMO Carriers |

There are a number of additional options for flexibility. In one set of examples, feedback of CQI and ACK/NAK signals for 3 DL carriers with 1 MIMO carrier may be supported using the two options described below. In the examples shown, carriers 1 and 2 are non-MIMO, while carrier 3 is MIMO.

Figure 17:
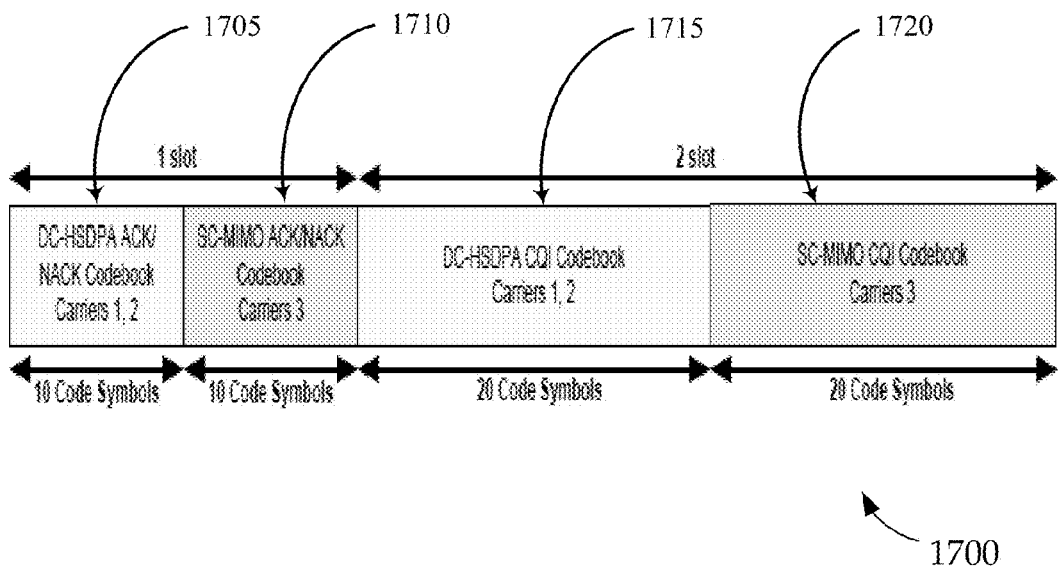
FIGS. 17-19 are a block diagrams of various control channel configurations for transmitting CQI and acknowledgement data when two carriers are activated.

FIG. 17 illustrates a first option for transmitting CQI and acknowledgement information in a TTI 1700. In FIG. 17, the acknowledgement information for non-MIMO carriers 1 and 2 may be encoded using the DC-HSDPA ACK/NAK codebook 1705, while the acknowledgement information for MIMO carrier 3 may be encoded using the SC-MIMO ACK/NAK codebook 1710. The channel quality information for non-MIMO carriers 1 and 2 may be encoded using codewords from the DC-HSDPA CQI codebook, and provided in a single slot 1715. The channel quality information for MIMO carrier 3 may be encoded using codewords from the SC-MIMO CQI codebook in the subsequent slot 1720. The CQI feedback cycle may be 1 for all three carriers 1, 2, and 3.

Figure 18:
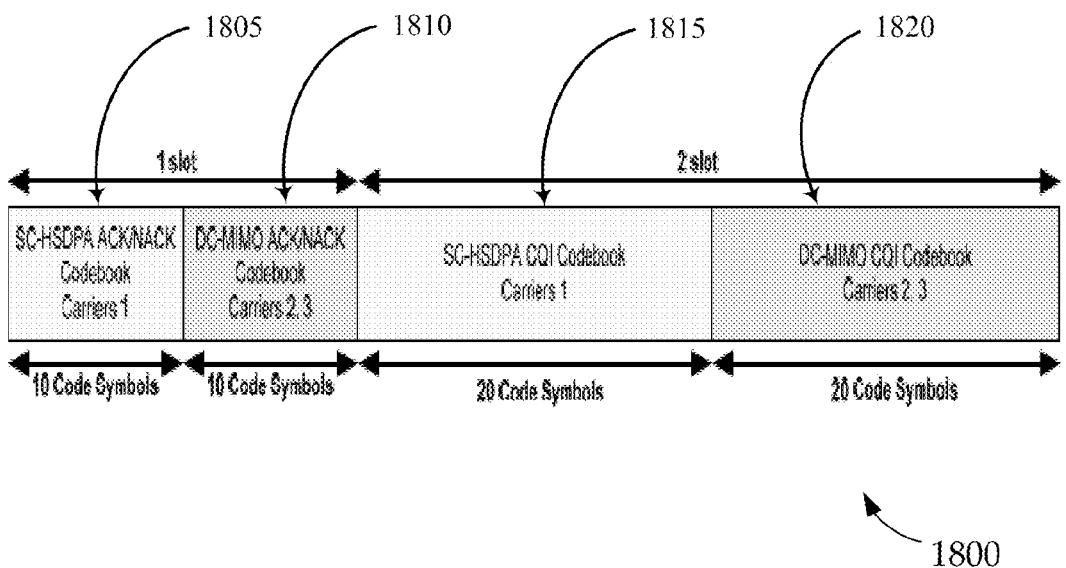

FIG. 18 illustrates a second option for transmitting CQI and acknowledgement information in a TTI 1800. In FIG. 18, the acknowledgement information for non-MIMO carrier 1 may be encoded using the SC-HSDPA ACK/NAK codebook 1805, while the acknowledgement information for non-MIMO carrier 2 and MIMO carrier 3 may be encoded using the DC-MIMO ACK/NAK codebook 1810. Furthermore, the channel quality information for non-MIMO carrier 1 may be encoded using codewords from the SC-HSDPA CQI codebook 1815, while the channel quality information for non-MIMO carrier 2 and MIMO carrier 3 may be encoded using codewords from the DC-MIMO CQI codebook 1820. Furthermore, the CQI feedback cycle for carriers 2 and 3 may be 2, while the CQI feedback cycle for carrier 1 may be 1.

Figure 19:
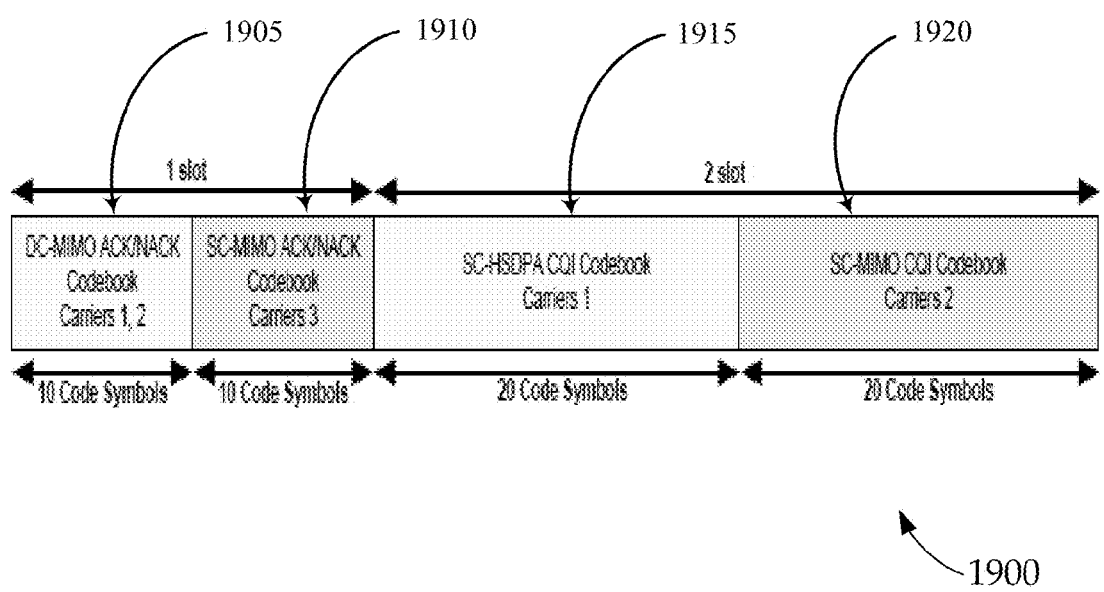

In another example, feedback of CQI and ACK/NAK signals for 3 DL carriers with 2 MIMO carrier may be supported. Carrier 1 is non-MIMO, while carriers 2 and 3 are MIMO. FIG. 19 illustrates an option for transmitting CQI and acknowledgement information in a TTI 1900. In FIG. 19, the acknowledgement information for non-MIMO carrier 1 and MIMO carrier 2 may be encoded using the DC-MIMO ACK/NAK codebook 1905, while the acknowledgement information for MIMO carrier 3 may be encoded using the SC-MIMO ACK/NAK codebook 1910, as earlier described herein. Furthermore, the CQI for non-MIMO carrier 1 may be encoded using codewords from the SC-HSDPA CQI codebook 1915, while the CQI for one of the MIMO carriers (MIMO carrier 2 in FIG. 19) may be encoded using codewords from the SC-MIMO CQI codebook in the subsequent slot 1920. Note the CQI signal for the other MIMO carrier (i.e., MIMO carrier 3 in this example) may be transmitted in a later slot. The CQI feedback cycle may be 1.5 for all three carriers, and the C/P of SC-HSDPA CQI may be 2 dB lower than the C/P of the DC-MIMO CQI.

Thus, as illustrated in the examples set forth in FIGS. 8-19, different codebooks, spreading factors, and mapping may be used when transmitting CQI and acknowledgement information on the uplink, and the configuration may depend on the numbers of carriers activated and on whether MIMO is used. Repetition and joint encoding may also be used based on these factors. Using these techniques in a flexible manner, a constant feedback cycle is maintained in some examples.

A number of techniques may also be used for logical mapping of active carriers in the system. In an HSDPA system, the logical mapping of carriers to frequencies may be provided by RRC signaling, and may be made as follows: C1->F1, C2->F2, C3->F3, and C4->F4, wherein C1-C4 denote logical carrier numbers 1 through 4, and F1-F4 denote actual carrier frequencies 1 through 4. In one example, if 4 DL carriers are configured and the NodeB deactivates 1 carrier, a possible resultant set of active carriers may be listed:

1) 3 DL carriers; 3 Non-MIMO carriers;
2) 3 DL carriers; 2 Non-MIMO carriers+1 MIMO carrier;
3) 3 DL carriers; 1 Non-MIMO carrier+2 MIMO carriers; and
4) 3 DL carriers; 3 MIMO carriers.

Because of the fact that so many combinations are possible, rules for mapping may be desirable. In one example, the order of logical mapping shall be maintained when a carrier is deactivated.

Figure 20:
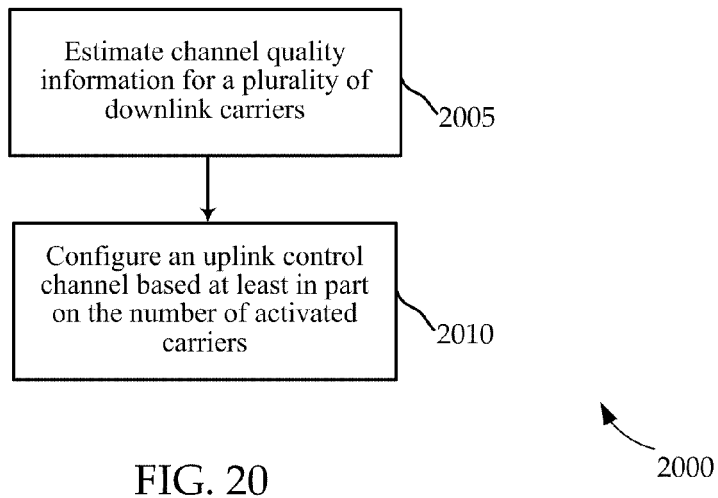
FIG. 20 is a flowchart illustrating an implementation of a CQI transmission.

FIG. 20 is a flowchart of a method 2000 for configuring an uplink control channel. The method 2000 may be performed, for example, in whole or in part by a UE 115 as described with reference to FIG. 1, 2, 4, or 6, implemented in the system 100 of FIG. 1 or system 200 of FIG. 2. At block 2005, channel quality information is estimated for a plurality of downlink carriers. At block 2010, an uplink control channel is configured based at least in part on a number of carriers in the plurality.

Figure 21:
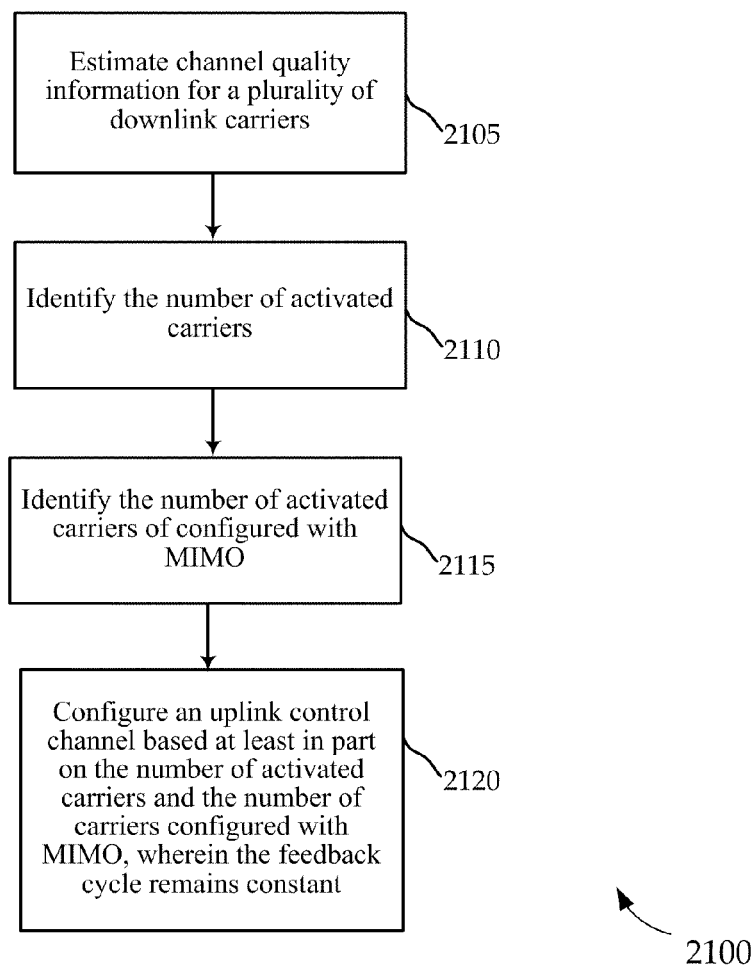
FIG. 21 is a flowchart illustrating an alternative implementation of a CQI transmission.

FIG. 21 is a flowchart of a method 2100 for configuring an uplink control channel. The method 2100 may be performed, for example, in whole or in part by a UE 115 as described with reference to FIG. 1, 2, 4, or 6, implemented in the system 100 of FIG. 1 or system 200 of FIG. 2.

At block 2105, channel quality information is estimated for a plurality of downlink carriers. At block 2110, the number of active carriers are identified. At block 2115, the number of active carriers configured with MIMO are identified. At block 2120, an uplink control channel is configured based at least in part on the number of carriers in the plurality and the number of carriers configured with MIMO, wherein the feedback cycle remains constant.

Figure 22:
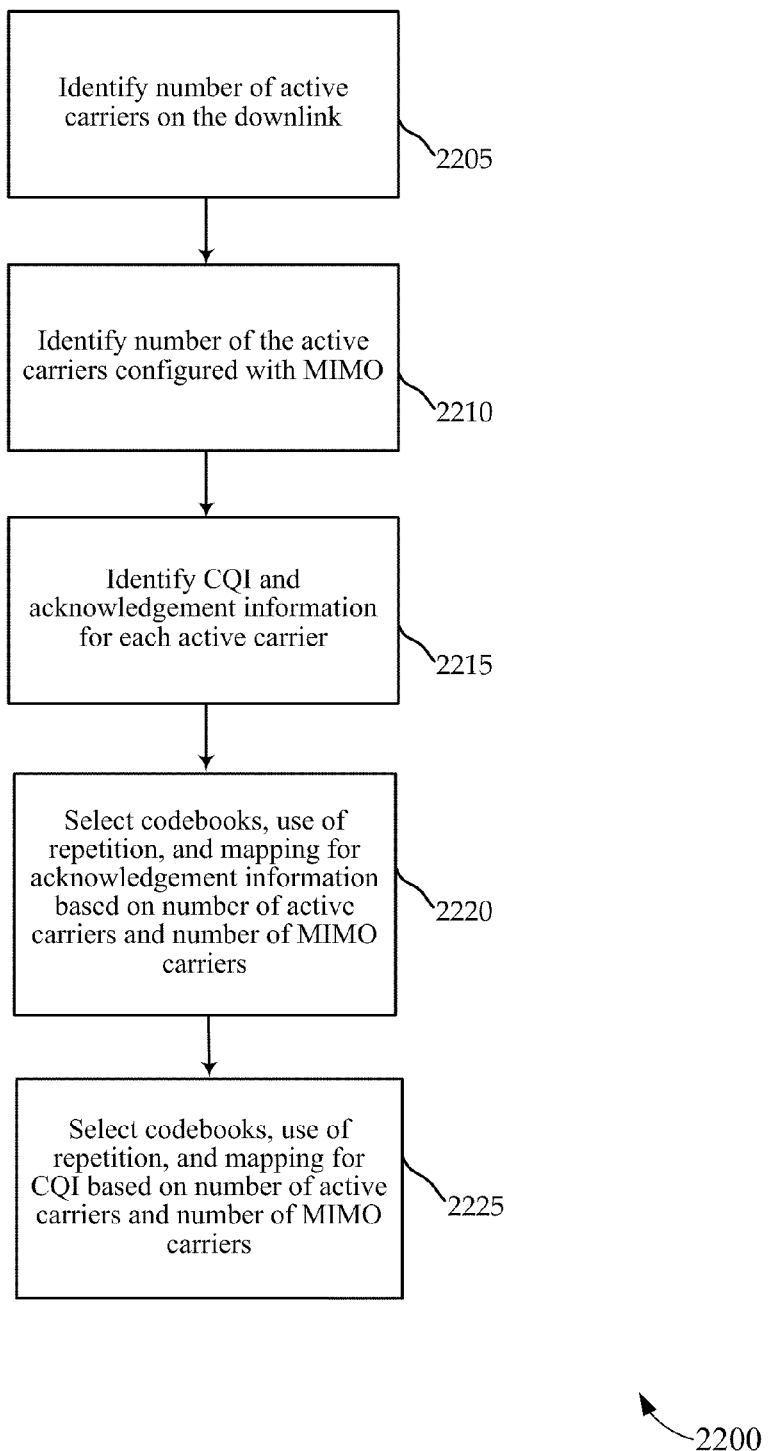
FIG. 22 is a flowchart of illustrating an alternative implementation of a CQI transmission.

FIG. 22 is a flowchart of a method 2200 for configuring an uplink control channel. The method 2200 may be performed, for example, in whole or in part by a UE 115 as described with reference to FIG. 1, 2, 4, or 6, implemented in the system 100 of FIG. 1 or system 200 of FIG. 2.

At block 2205, the number of active carriers on the downlink are identified. At block 2210, a number of the active carriers configured with MIMO are identified. At block 2215, CQI and acknowledgement information for each active carrier are identified. At block 2220, the codebooks, use of repetition, and mapping related to transmission of acknowledgement information are selected, based on the number of active carriers and the number of MIMO carriers. At block 2225, the codebooks, use of repetition, and mapping related to transmission of CQI are selected, based on the number of active carriers and the number of MIMO carriers.

Considerations Regarding the Description

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing a thorough understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, servers, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

These units of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

What is claimed is:

1. A method for wireless communications, comprising:
    estimating channel quality information for a plurality of downlink carriers;
    identifying a number of activated carriers in the plurality of downlink carriers; and
    configuring an uplink control channel based at least in part on a number of activated carriers in the plurality, of downlink carriers,
    wherein the uplink control channel is configured using an encoding scheme selected based at least in part on the number of activated carriers while maintaining a constant feedback cycle independent of the number of activated carriers.

2. The method of claim 1, wherein the configuring of the uplink control channel comprises:
    repeating a codeword within a portion of a transmit timing interval when the number of activated carriers are identified in the plurality of downlink carriers, wherein the number of activated carriers comprise one activated carrier or two activated carriers.

3. The method of claim 2, wherein the configuring of the uplink control channel further comprises:
    adjusting power in a mobile device transmitting the uplink control channel responsive to the repeating.

4. The method of claim 1, wherein the configuring of the uplink control channel comprises:
    encoding, when the number of activated carriers are identified in the plurality of downlink carriers, channel quality information for a first carrier in a first codeword and channel quality information for a second carrier in a second codeword; and
    grouping the first codeword and the second codeword for transmission within a transmit timing interval when the number of activated carriers comprises three or more activated carriers.

5. The method of claim 4, wherein the configuring of the uplink control channel further comprises:
    repeating the first codeword and the second codeword in the transmit timing interval.

6. The method of claim 1, wherein the configuring of the uplink control channel comprises:
    encoding, acknowledgement information for a first carrier and a second carrier using a first codeword and acknowledgement information for a third carrier and a fourth carrier using a second codeword; and
    grouping the first codeword and the second codeword for transmission within a slot of a transmit timing interval.

7. The method of claim 6, wherein the configuring the uplink control channel further comprises:
    encoding, when the number of activated carriers are identified in the plurality of downlink carriers, acknowledgement information for one or more carriers using a third codeword; and
    repeating the third codeword within the slot of the transmit timing interval.

8. The method of claim 1, wherein the configuring of the uplink control channel comprises:
    encoding, when three activated carriers are indentified in the plurality of downlink carriers, acknowledgement information for a first carrier and a second carrier using a first codeword and acknowledgement information for a third carrier using a second codeword; and
    grouping the first codeword and the second codeword for transmission within a slot of a transmit timing interval.

9. The method of claim 1, wherein the configuring of the uplink control channel comprises:
    encoding acknowledgement information for one or more carriers using a first codeword for transmission within a half-slot of a transmit timing interval.

10. The method of claim 1, wherein the configuring of the uplink control channel further comprises:
    configuring an uplink control channel when one or more of the plurality of downlink carriers are configured with multiple-input and multiple-output.

11. The method of claim 1, wherein the configuring of the uplink control channel further comprises:
    using a first spreading factor for a portion of transmit timing interval when a first number of activated carriers are indentified in the plurality of downlink carriers; and
    using a second spreading factor for the portion of transmit timing interval when a second number of activated carriers are indentified in the plurality downlink carriers, the second number different from the first number.

12. The method of claim 1, wherein the configuring of the uplink control channel further comprises:
    encoding, when there is a discontinuous transmission for the number of activated carriers in the plurality of downlink carriers, acknowledgement information for the number of carriers using a codeword indicating a discontinuous transmission.

13. The method of claim 1, wherein the configuring of the uplink control channel further comprises:

mapping a first carrier to a first portion of a transmit timing interval when a first number of activated carriers are indentified in the plurality of downlink carriers; and mapping the first carrier to a second portion of a transmit timing interval when a second number of activated carriers are indentified in the plurality of downlink carriers, the second number different from the first number.

14. The method of claim 1, wherein the configuring of the uplink control channel further comprises:
identifying at least four carriers, the four carriers associated with a logical sequential order;
identifying deactivation of one of the at least four carriers; and
preserving a logical sequential order of remaining active carriers on the uplink control channel.

15. The method of claim 1, wherein the configuring of the uplink control channel further comprises:
identifying activation of a first number of carriers;
identifying activation of an additional carrier; and
changing configuration of the uplink control channel responsive to the activation of the additional carrier.

16. A mobile terminal for wireless communications, comprising:
a channel quality information measurement module configured to estimate channel quality information for a plurality of downlink carriers;
a carrier detection module configured to identify a number of activated carriers in the plurality of downlink carriers; and
a feedback encoder module, communicatively coupled with the channel quality information measurement module and the carrier detection module, and configured to modify an uplink control channel based at least in part on a number of activated carriers in the plurality of downlink carriers,
wherein the uplink control channel is configured using an encoding scheme selected based at least in part on the number of activated carriers while maintaining a constant feedback cycle independent of the number of activated carriers.

17. The mobile terminal of claim 16, wherein to modify the uplink control channel, the feedback encoder module is further configured to:
repeat a codeword for a portion of a transmit timing interval when the first number of activated carriers are identified in the plurality of downlink carriers, wherein the number of activated carriers comprise one activated carrier or two activated carriers.

18. The mobile terminal of claim 16, wherein to modify the uplink control channel, the feedback encoder module is further configured to:
repeat a codeword in a transmit timing interval; and
adjust transmission power in the mobile terminal responsive to the repetition.

19. The mobile terminal of claim 16, wherein to modify the uplink control channel, the feedback encoder module is further configured to:
group, when a first number of activated carriers are identified in the plurality of downlink carriers, channel quality information for a first carrier in a first codeword; and
repeat the first codeword in a portion of a transmit timing interval.

20. The mobile terminal of claim 16, wherein to modify the uplink control channel, the feedback encoder module is configured to:
encode, when the number of activated carriers are identified in the plurality of downlink carriers, channel quality information for a first carrier in a first codeword and channel quality information for a second carrier in a second codeword; and
group the first codeword and the second codeword for transmission within the portion of the transmit timing interval when the number of activated carriers comprises three or more activated carriers.

21. The mobile terminal of claim 16, wherein to modify the uplink control channel, the feedback encoder module is further configured to:
encode, when the number of activated carriers are identified in the plurality of downlink carriers, acknowledgement information for a first carrier and a second carrier using a first codeword and acknowledgement information for a third carrier and a fourth carrier using a second codeword; and
group the first codeword and the second codeword for transmission within a slot of a transmit timing interval.

22. The mobile terminal of claim 21, wherein to modify the uplink control channel, the feedback encoder module is further configured to:
encode, when there is a second number of activated carriers in the plurality of downlink carriers, acknowledgement information for two carriers using a third codeword; and
repeat the third codeword within the slot of the transmit timing interval.

23. The mobile terminal of claim 16, wherein to modify the uplink control channel, the feedback encoder module is further configured to:
encode, when the number of activated carriers identified in the plurality of downlink carriers, acknowledgement information for a first carrier and a second carrier using a first codeword and acknowledgement information for a third carrier using a second codeword; and
group the first codeword and the second codeword for transmission within a slot of a transmit timing interval.

24. The mobile terminal of claim 16, wherein to modify the uplink control channel, the feedback encoder module is configured to:
encode acknowledgement information for one or more carriers using a first codeword for transmission within a half-slot of a transmit timing interval.

25. The mobile terminal of claim 16, wherein to modify the uplink control channel, the feedback encoder module is further configured to:
encode, when a first number of activated carriers are identified in the plurality, acknowledgement information for the number of the activated carriers using a codeword indicating a discontinuous transmission.

26. The mobile terminal of claim 16, wherein to modify the uplink control channel, the feedback encoder module is further configured to:
modify the uplink control channel when one or more of the plurality of downlink carriers are configured with multiple-input and multiple-output.

27. The mobile terminal of claim 16, wherein to modify the uplink control channel, the feedback encoder module is further configured to:
use a first spreading factor for a portion of a transmit timing interval when a first number of activated carriers are identified in the plurality downlink carriers; and
use a second spreading factor for the portion of the transmit timing interval when a second number of activated carriers are identified in the plurality of downlink carriers, the second number different from the first number.

28. The mobile terminal of claim 16, wherein to modify the uplink control channel, the feedback encoder module is further configured to:
  map a first carrier to a first portion of a transmit timing interval when a first number of activated carriers are identified in the plurality of downlink carriers; and
  map the first carrier to a second portion of a transmit timing interval when a second number of activated carriers are identified in the plurality of downlink carriers, the second portion different from the first portion.

29. The mobile terminal of claim 16, wherein,
  at least four carriers are activated, the four carriers associated with a logical sequential order; and
  when one of the at least four carriers are de-activated, the logical sequential order of the remaining active carriers is preserved in the uplink control channel.

30. The mobile terminal of claim 16, wherein,
  the channel quality information measurement module is further configured to:
    identify that a first number of carriers are activated; and
    identify activation of an additional carrier; and
  the feedback encoder module is further configured to modify configuration of the uplink control channel responsive to the activation of the additional carrier.

31. A device for wireless communications, comprising:
  means for estimating channel quality information for a plurality of downlink carriers; and
  means for configuring an uplink control channel based at least in part on the number of activated carriers in the plurality of downlink carriers,
  wherein the uplink control channel is configured using an encoding scheme selected based at least in part on the number of activated carriers while maintaining a constant feedback cycle independent of the number of activated carriers.

32. The device of claim 31, wherein the means for configuring the uplink control channel further comprises:
  means for repeating a codeword within a portion of a transmit timing interval when the number of activated carriers are identified in the plurality of downlink carriers, wherein the number of activated carriers comprise one activated carrier or two activated carriers.

33. The device of claim 32, wherein the means for configuring the uplink control channel comprises:
  means for adjusting power in a mobile device transmitting the uplink control channel responsive to the repeating.

34. The device of claim 31, wherein the means for configuring the uplink control channel further comprises:
  means to configure an uplink control channel when one or more of the plurality of downlink carriers are configured with multiple-input and multiple-output.

35. A non-transitory computer-readable medium storing computer-executable code for wireless communications, comprising:
  code for causing a computer to estimate channel quality information for a plurality of downlink carriers;
  code for causing the computer to identify a number of activated carriers in the plurality of downlink carriers; and
  code for causing the computer to configure an uplink control channel based at least in part on a number of activated carriers in the plurality of downlink carriers,
  wherein the uplink control channel is configured using an encoding scheme selected based at least in part on the number of activated carriers while maintaining a constant feedback cycle independent of the number of activated carriers.

36. The computer-readable medium of claim 35, wherein the code for causing a computer to configure the uplink control channel further comprises:
  code for causing a computer to repeat a codeword within a portion of a transmit timing interval when the number of activated carriers are identified in the plurality of downlink carriers, wherein the number of activated carriers comprise one activated carrier or two activated carriers.

37. The computer-readable medium of claim 36, wherein the code for causing a computer to configure the uplink control channel further comprises:
  code for causing a computer to adjust power in a mobile device transmitting the uplink control channel responsive to the repeating.

38. The computer-readable medium of claim 35, wherein the code for causing a computer to configure the uplink control channel further comprises:
  code for causing a computer to configure an uplink control channel when one or more of the plurality of downlink carriers are configured with multiple-input and multiple-output.

39. The method of claim 1, wherein the configuring of the uplink control channel comprises configuring a channel quality indicator format corresponding to the number of activated carriers.

40. The apparatus of claim 16, wherein to modify the uplink control channel, the feedback encoder module is further configured to configure a channel quality indicator format corresponding to the number of activated carriers.

41. The apparatus of claim 17, wherein to modify the uplink control channel, the feedback encoder module is further configured to use varied codewords for the portion of the transmit timing interval when a second number of activated carriers are identified in the plurality, the second number different from the first number.

* * * * *